Oct. 28, 1969 V. E. HENLEY 3,475,254
TIRE BUILDING MACHINE
Filed Jan. 5, 1965 10 Sheets-Sheet 1
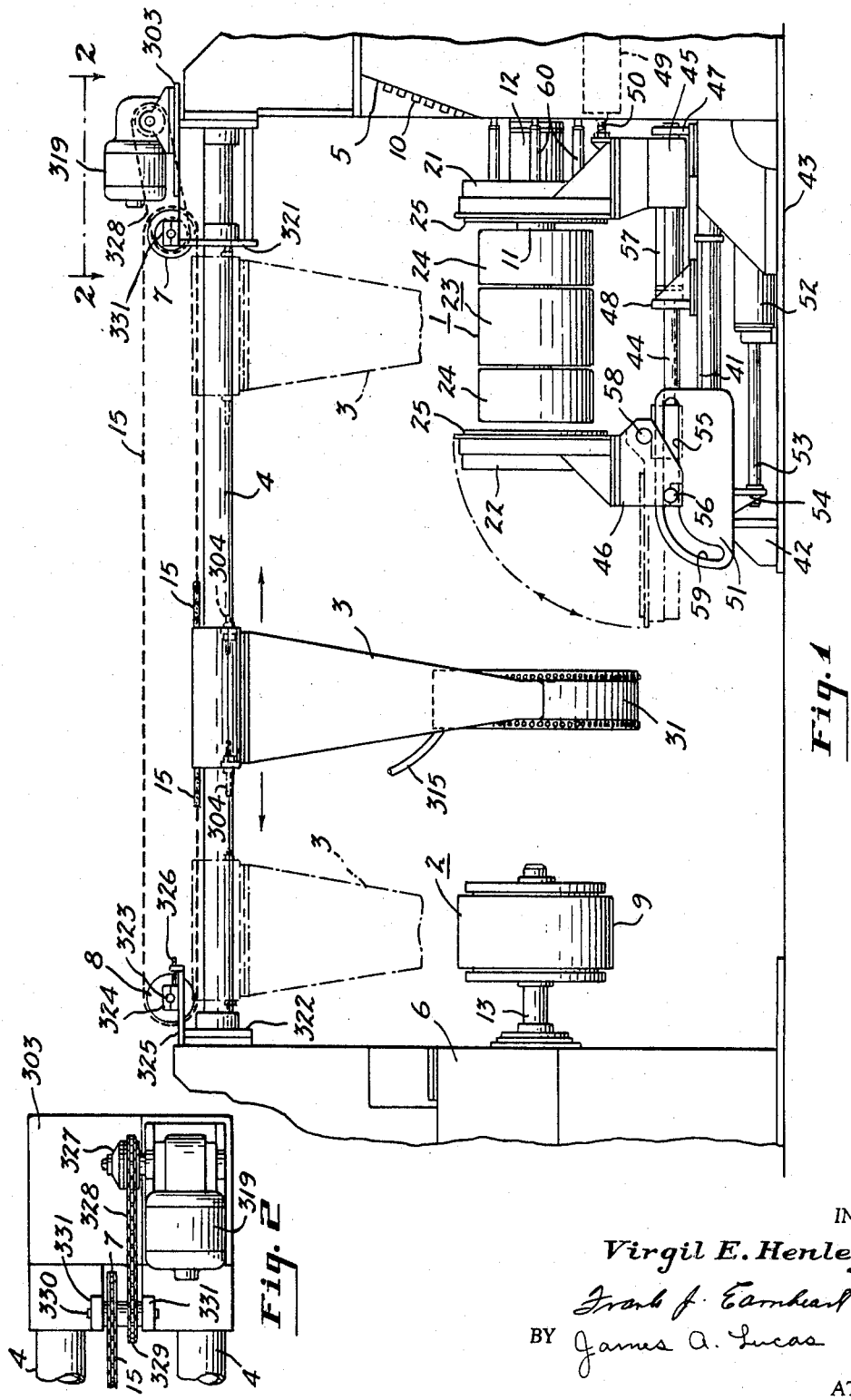
INVENTOR
Virgil E. Henley
BY
ATTORNEY

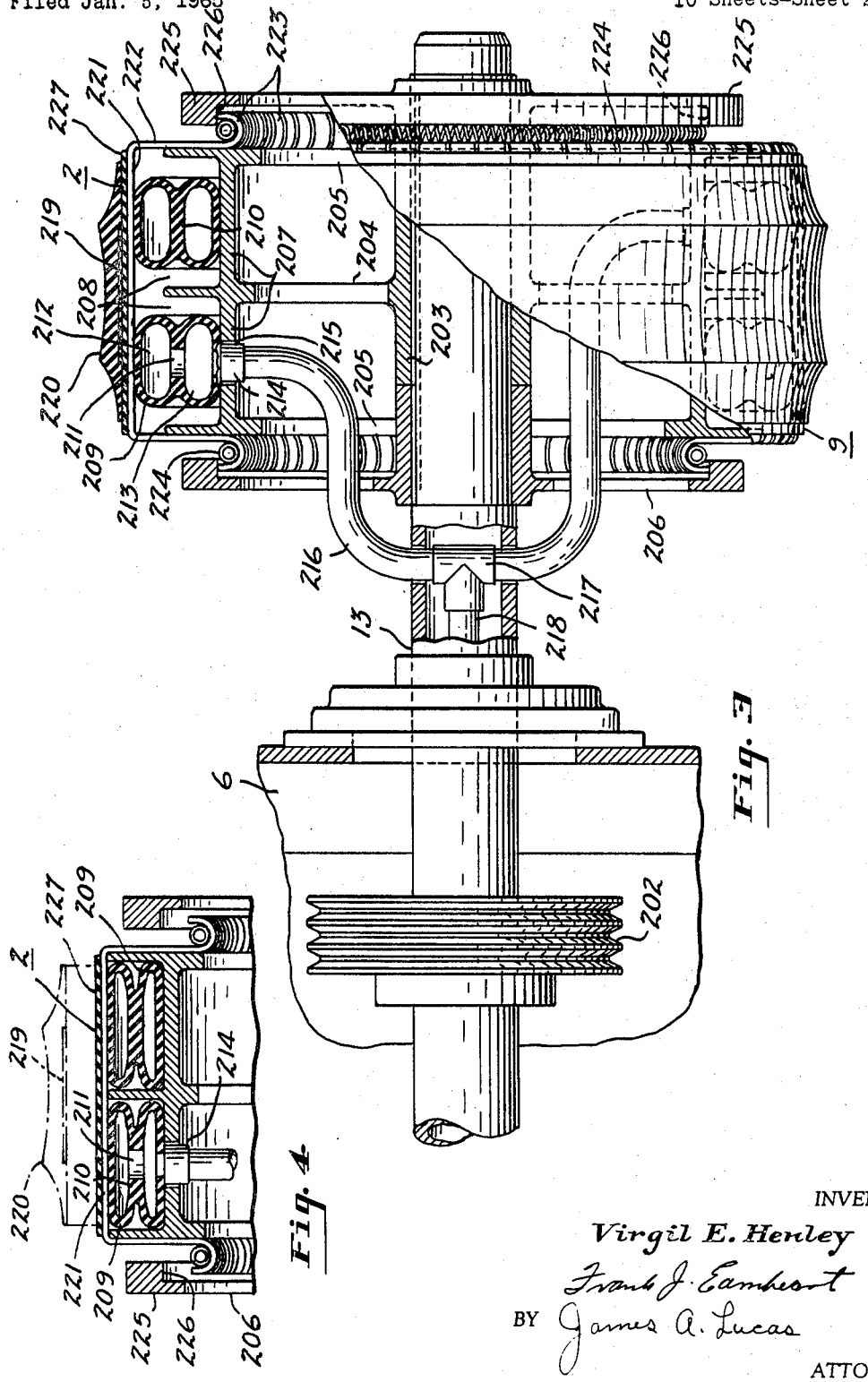

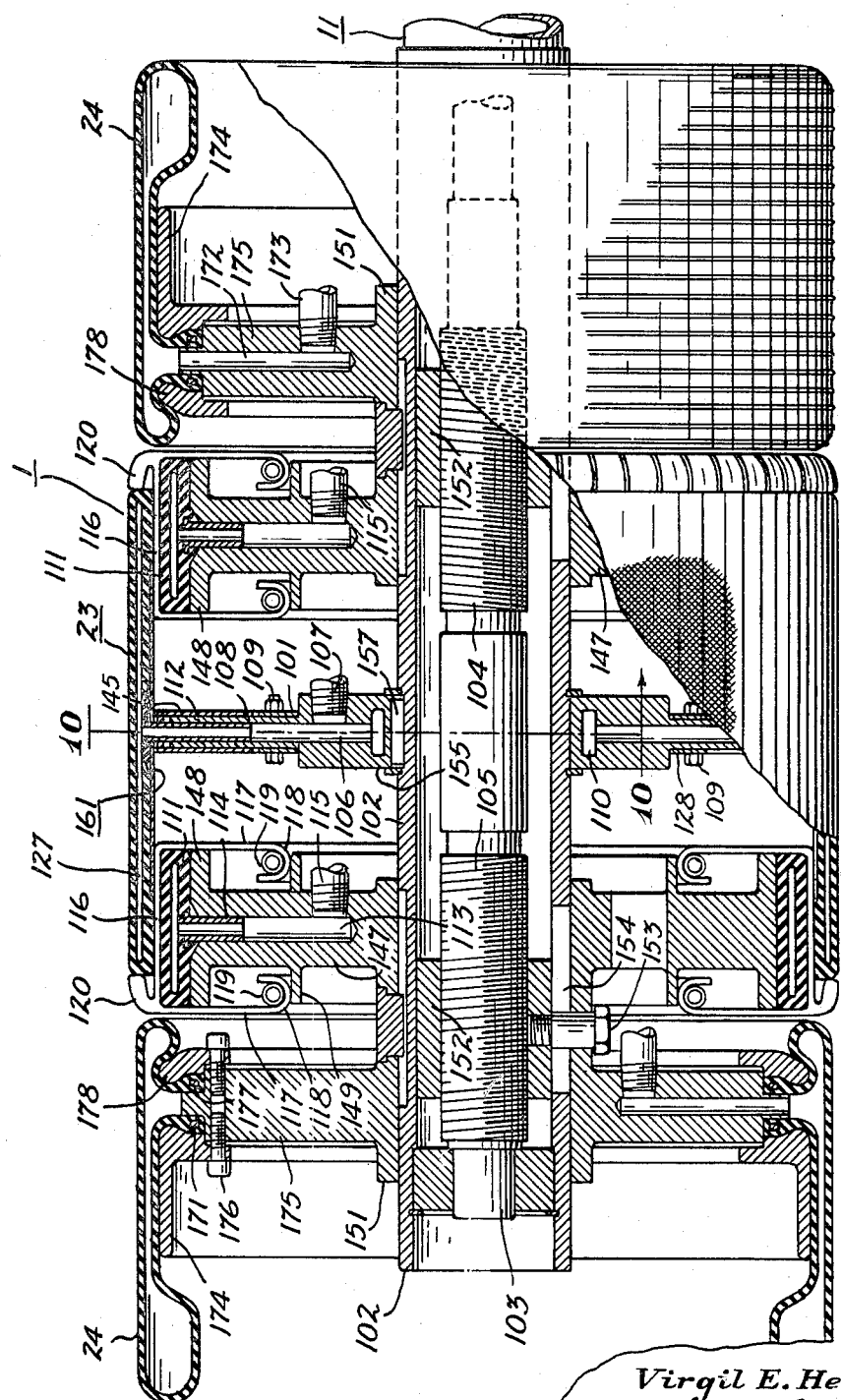

Oct. 28, 1969   V. E. HENLEY   3,475,254
TIRE BUILDING MACHINE
Filed Jan. 5, 1965   10 Sheets-Sheet 5
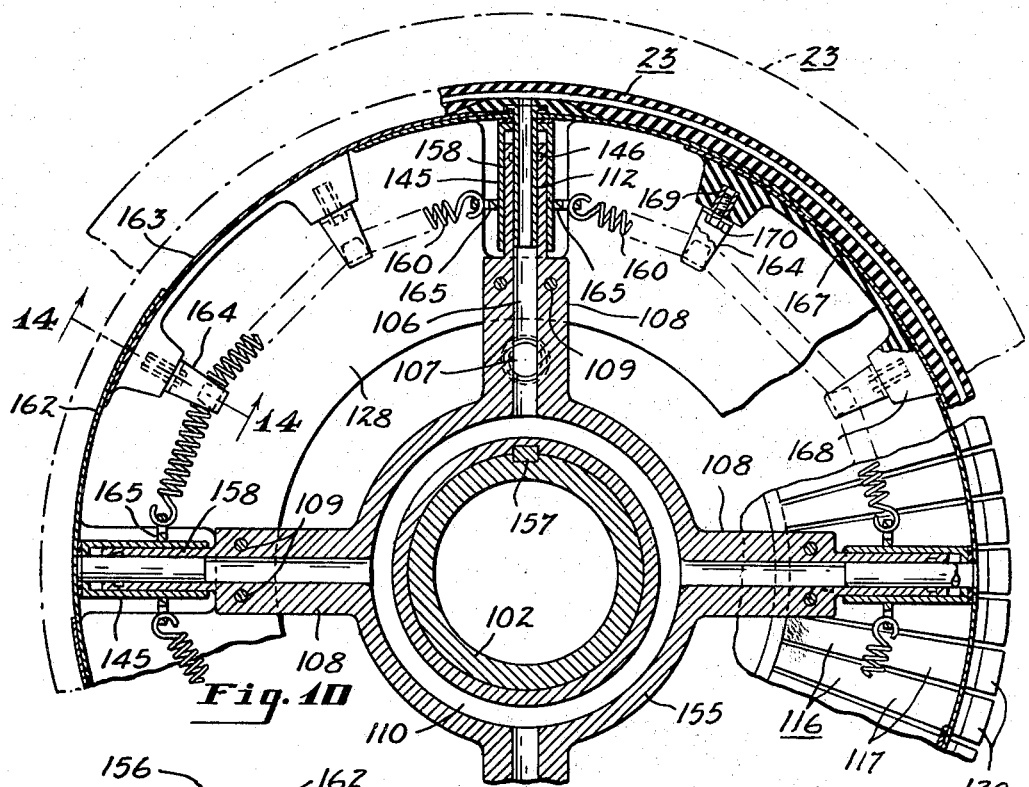
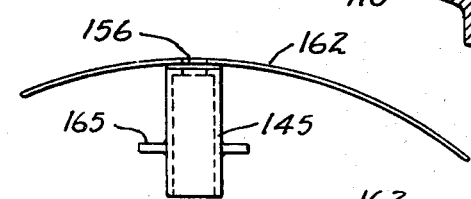
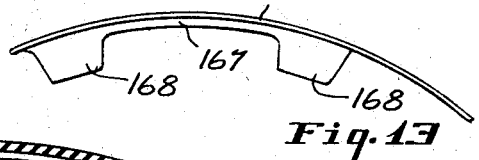
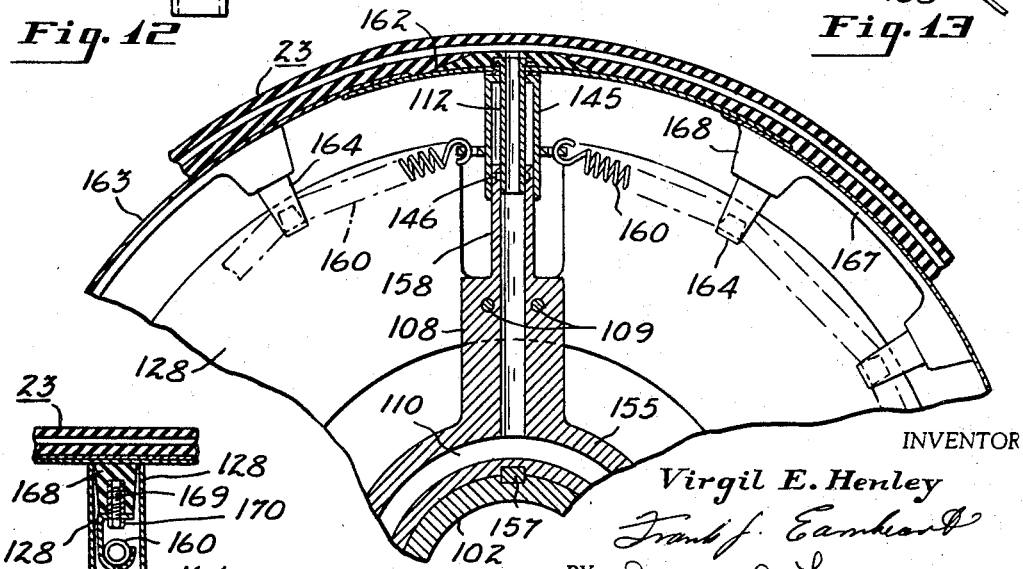
INVENTOR
Virgil E. Henley
BY Frank J. Earnhart
James A. Lucas
ATTORNEY

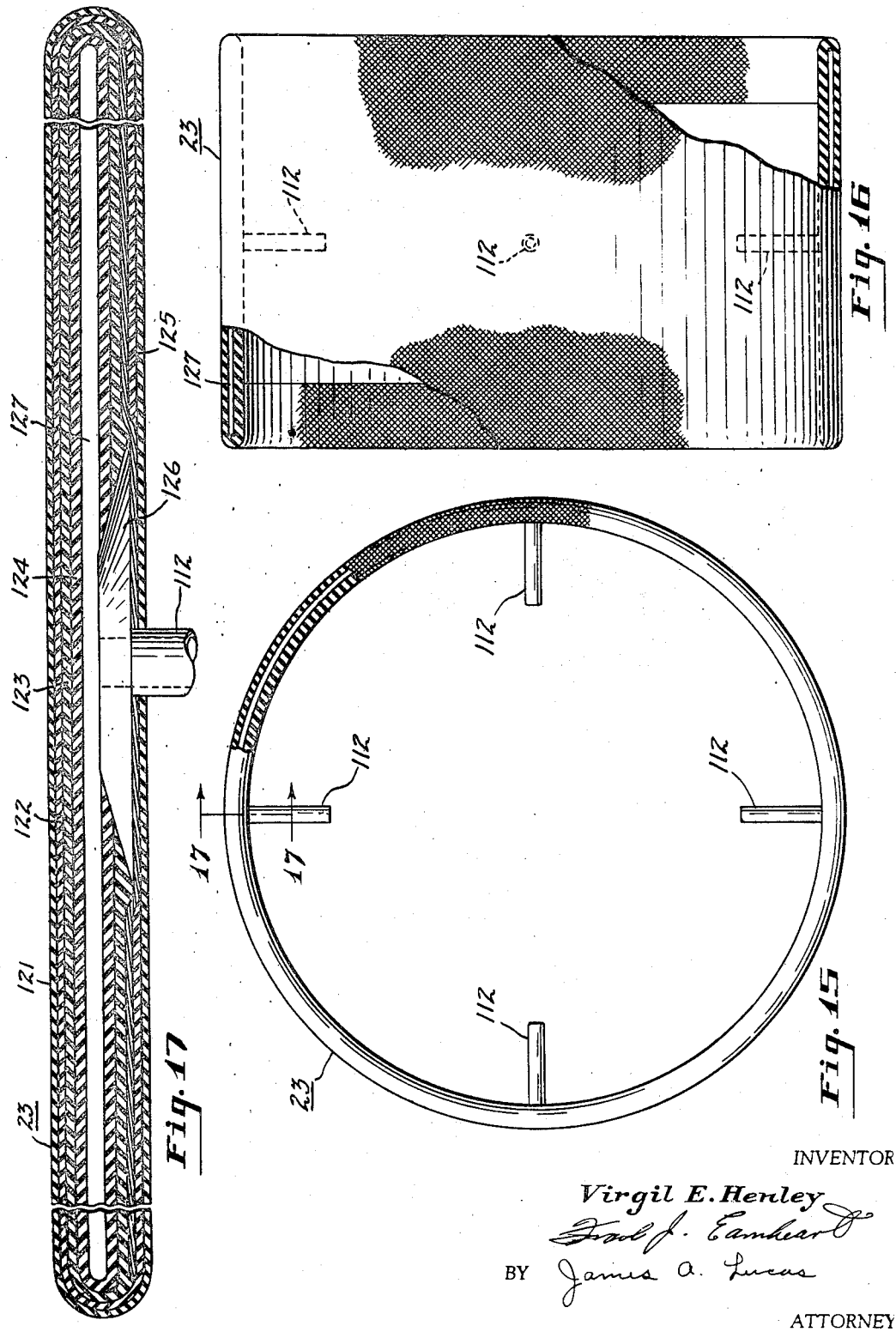

Oct. 28, 1969     V. E. HENLEY     3,475,254
TIRE BUILDING MACHINE
Filed Jan. 5, 1965     10 Sheets-Sheet 7
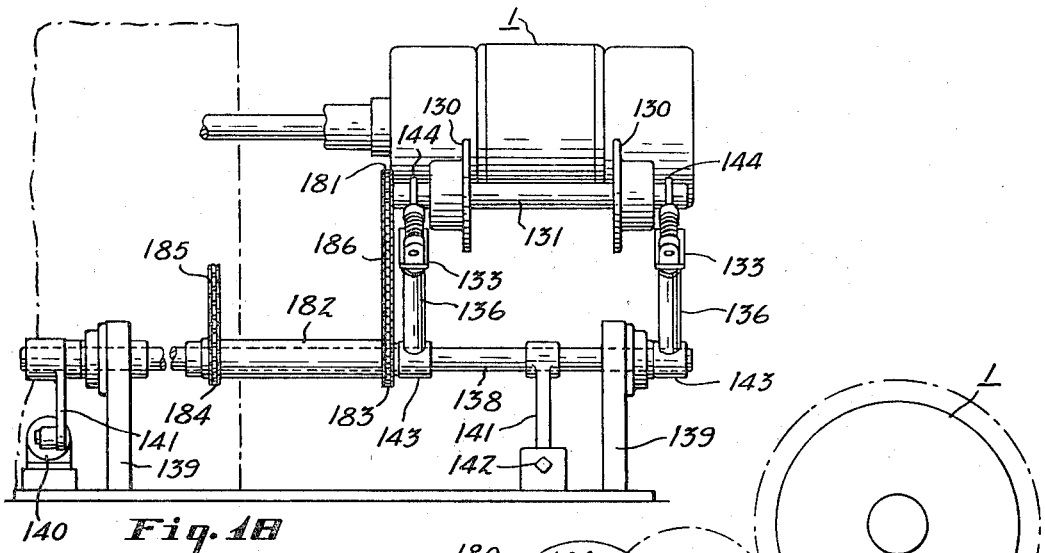
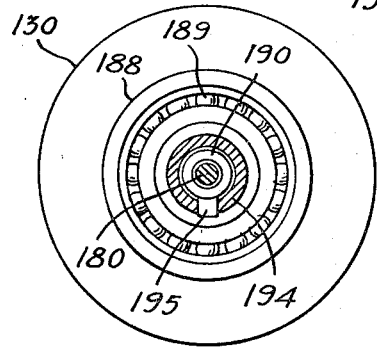
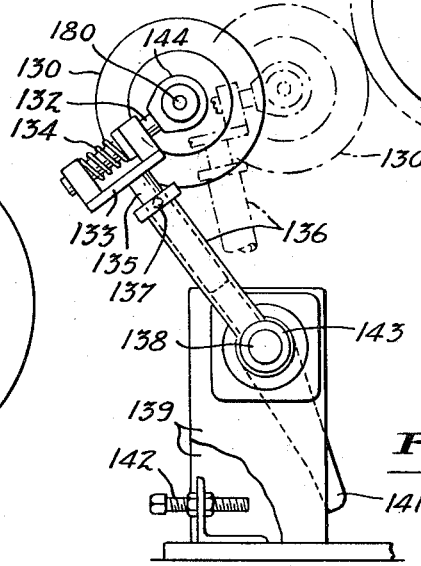
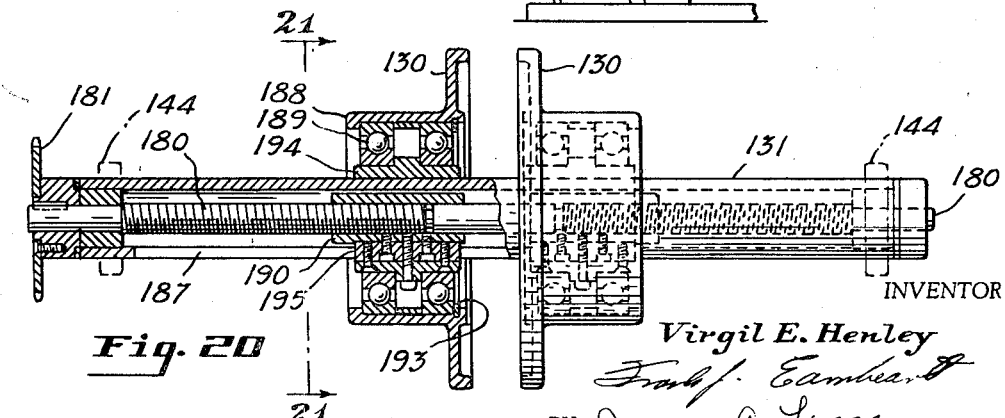
INVENTOR
Virgil E. Henley
BY
ATTORNEY

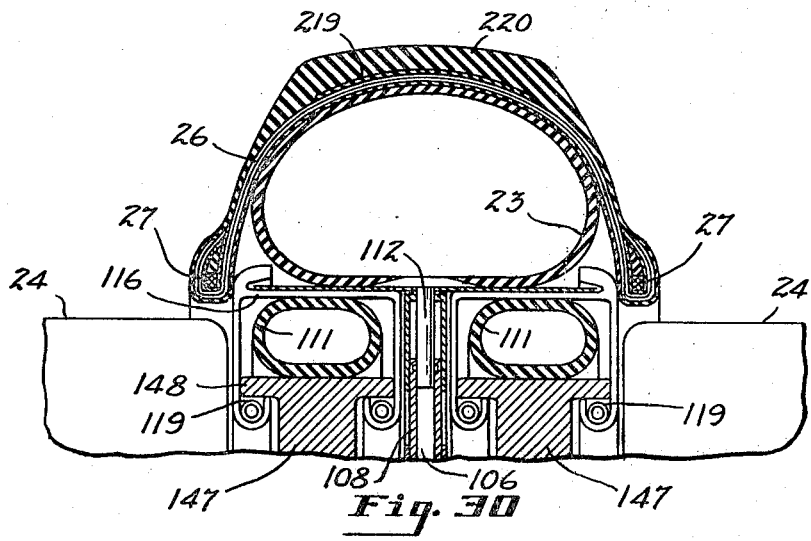
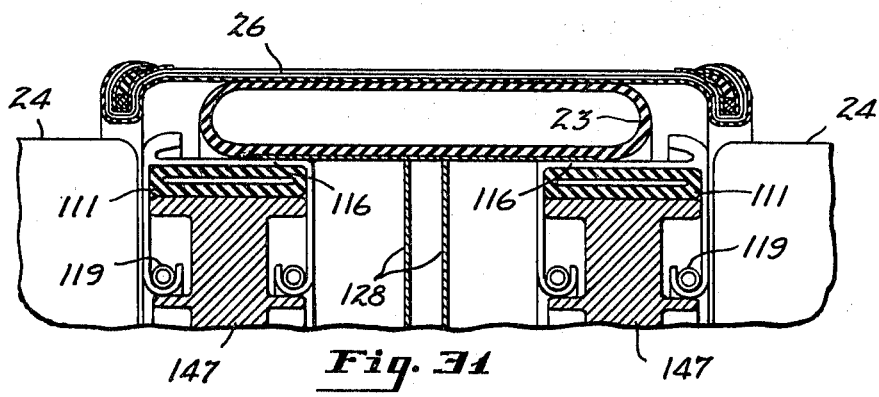
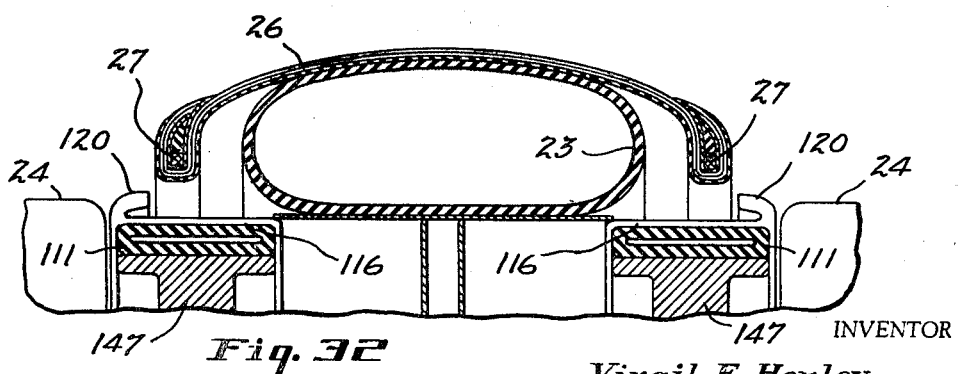

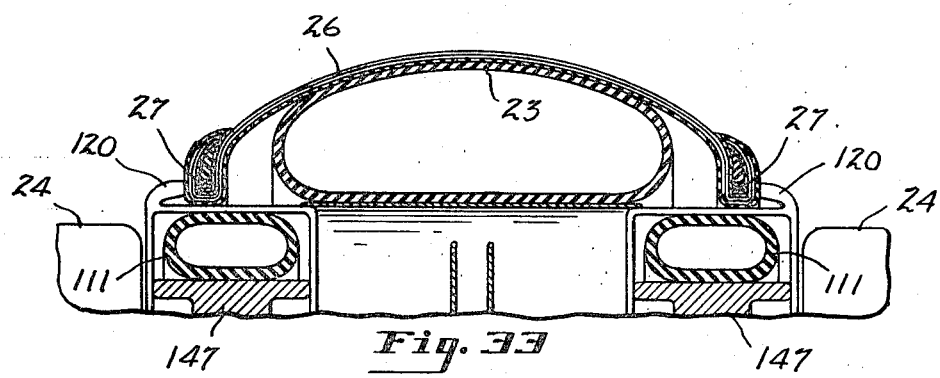
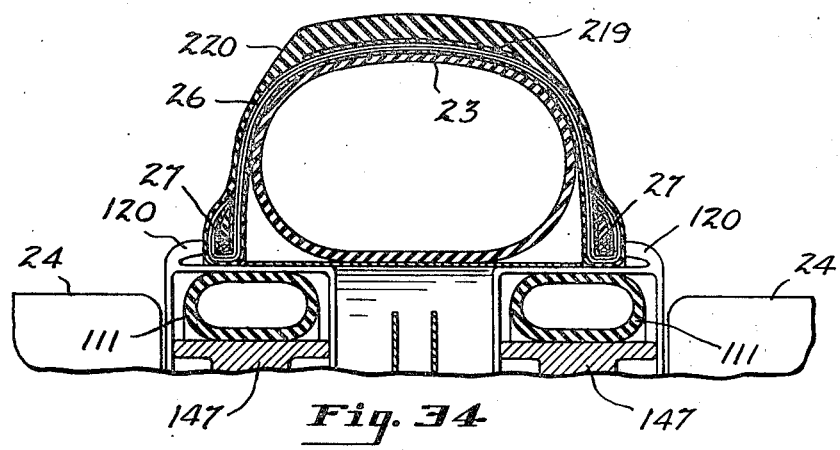
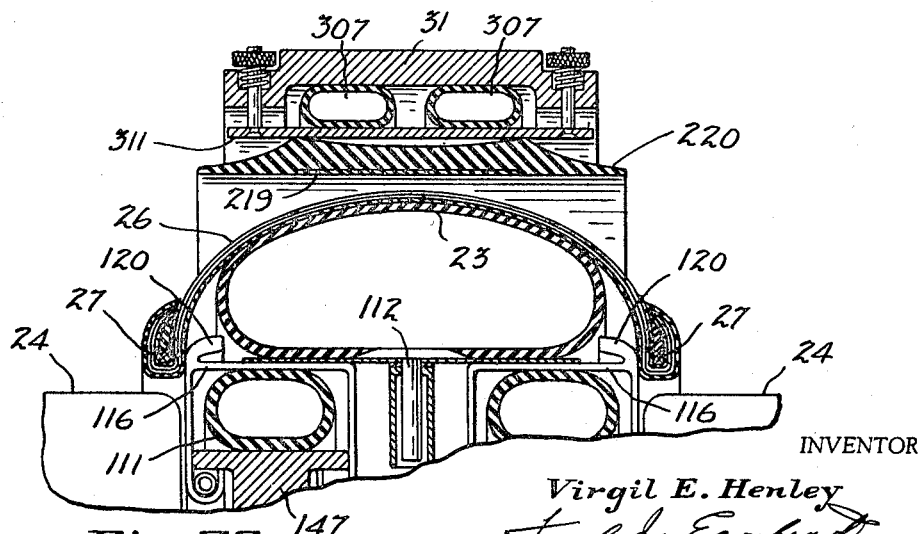

United States Patent Office 3,475,254
Patented Oct. 28, 1969

3,475,254
TIRE BUILDING MACHINE
Virgil E. Henley, Akron, Ohio, assignor to The General
Tire & Rubber Company, a corporation of Ohio
Filed Jan. 5, 1965, Ser. No. 423,442
Int. Cl. B29h 17/16, 17/12
U.S. Cl. 156—401                                      20 Claims

ABSTRACT OF THE DISCLOSURE

A tire building machine, particularly for radial ply tires, utilizes a pair of co-axial spaced apart building drums and a transfer ring that moves on overhead rails between the drums. One of the drums is used for the construction and shaping of the tire carcass. The tread and inextensible breakers are assembled on the second drum and are then moved therefrom by the transfer ring and are positioned around the carcass. The carcass is then formed into toric shape and is expanded into the inextensible tread and breaker. The transfer ring utilizes bladder means to urge a plurality of axially extending segments into gripping contact with the periphery of the assembled breaker and tread. Many unique features of the building and shaping drum are described including the shaping bladder and drum segments.

This invention relates to an apparatus and a method for building a pneumatic tire. More specifically this invention relates to an apparatus and method particularly well adapted to the construction of radial cord belted tires. Tires of this type have a carcass construction in which closely spaced parallel rubberized cords in each layer of the carcass run in a generally axial direction, and the rolling surface or tread portion of the tire is provided, immediately thereunderneath, with one or more inextensible breakers which extend in a circumferential or nearly circumferential direction around the tire.

For many years the tires that have been made in this country have been of the so-called bias ply type. By this is meant that the cords in the fabric plies constituting the carcass extend diagonally across the carcass at an angle which provides a suitable compromise between lateral stability, cornering characteristics, and ride. This angle is usually between 35 and 40°, measured at the crown of the tire, using the centerline of the tread, hereinafter referred to as the circumferential plane of the tire, as a reference. Typically tires of this type have been built by the "flat band" process utilizing equipment such as that described in U.S. 2,614,951; 2,614,952; and U.S. 2,628,652, all owned by the assignee of the present application.

In constructing a bias ply tire, a plurality of plies are formed into an annular band around a cylindrical surface after which the central portion of the band is uniformly expanded to provide bead ring receiving shoulders. Thereafter annular bead rings are placed against said shoulders and the edges of the plies of the band are manually or mechanically wrapped around the rings to form the bead portions of the tire. Chafer strips, sidewalls, breakers, and tread rubber are then applied to the carcass to complete the construction after which the tire is shaped and cured in a suitable mold.

More recently the apparatus used in the flat band method has been improved in certain respects, such as by the use of inflatable ply turnover bladders and annular push-over rings, to fold the edges of the carcass plies evenly and uniformly around the essentially inextensible bead rings used in the tire. Such an inflatable turnover means is shown in U.S. Patent No. 3,171,769 also owned by the assignee of the present invention.

With the advent of the radial cord tire, it has been found necessary to modify the process of building the tire due to the utilization of an inextensible breaker assembly or belt in the tire construction. Breakers consist of strips of closely spaced rubberized textile or wire cords positioned over the crown of the carcass between the carcass and the tread. In bias ply tires the cord angle of these breakers, relative to the circumferential plane of the tire, is generally in excess of about 35° in the flat band thereby allowing for a substantial amount of elongation or stretching of the breakers during shaping of the tire. However, it has been found desirable in radial cord tires to have the cords in the breaker strips disposed at a much smaller angle thereby serving to more effectively balance the angle of the cords in the carcass while concomitantly improving various riding characteristics of the tire. Because of this lower cord angle the breakers tend to resist stretching, which creates problems when the breakers are applied to the essentially flat carcass of relatively small diameter, and the tire is shaped to a finished tire in which the breaker strips have an appreciably larger diameter. Therefore, it has been found preferable to expand the tire to toric shape approximating its final diameter prior to applying the breaker strips and the tread.

One object of this invention is to provide a new apparatus and a process for the building of tires, especially radial cord belted tires.

It is another object of this invention to provide a new type of carcass building and expanding drum utilizing a number of inflatable elastomeric bladders to provide bead ring setting shoulders, for folding the edges of the plies over the bead rings and for shaping the carcass.

It is still another object to make use of two separate drums, one for building the carcass and the other for assembling the tread and breaker, and a novel transfer mechanism for moving the tread and breaker assembly from its drum to a central position over the carcass building drum prior to forming the carcass into toric shape.

It is still a further object to provide an annular transfer mechanism adapted to exert a radially inwardly directed gripping force against the outer surface of an annular tread and breaker assembly.

Another object of this invention is a process of building a radial cord pneumatic tire containing an essentially inextensible tread and breaker, said process comprising (1) building the carcass in substantially flat form, (2) separately assembling the inextensible breakers and tread in substantially the same diameter that they will assume in the finished tire, (3) centrally positioning the breaker-tread assembly over the flat formed carcass, (4) expanding the carcass to essentially toroidal shape into contact with the inside surface of said tread and breaker assembly, and (5) stitching the assembly onto the expanded carcass.

These and other objects will become evident in light of the following disclosure and drawings in which:

FIGURE 1 shows a side view of the over-all tire building apparatus showing the carcass building drum, tread and breaker building drum, and the transfer mechanism;

FIGURE 2 is a view taken along lines 2—2 of FIGURE 1 showing the drive arrangement for the transfer mechanism;

FIGURE 3 is a partial cut-away view of the expanded breaker-tread assembly drum with a breaker and tread disposed thereon;

FIGURE 4 is a partial cut-away view of the drum of FIGURE 3 with the drum collapsed to its minimum diameter;

FIGURE 9 represents a detailed partial cross-section of the carcass building and expanding drum and the annular turnover bladders;

FIGURE 10 is a view taken along lines 10—10 of FIGURE 9 showing overlapping gap shields in place when the building drum is collapsed;

FIGURE 11 is another view showing the gap shields when the drum is expanded;

FIGURE 12 is an end view of a guided gap shield;

FIGURE 13 is an end view of an unguided gap shield;

FIGURE 14 is a view taken along lines 14—14 of FIGURE 10 showing the side of a clip on an unguided shield;

FIGURE 15 shows an end view of the tire shaping bladder;

FIGURE 16 is a surface view, partially cut away, of the shaping bladder;

FIGURE 17 is a cross-sectional view taken along lines 17—17 of FIGURE 15;

FIGURE 18 is a view, taken from the rear of the carcass building drum, showing the stitcher mechanism;

FIGURE 19 is a side view of the stitcher mechanism;

FIGURE 20 is an enlarged partially sectioned detailed view of the stitching rollers;

FIGURE 21 is a view of rollers taken along line 21—21 of FIGURE 20;

FIGURE 29 is a partial cross-sectional view showing the initial expansion of the carcass with the transfer ring, holding the tread and breaker assembly, positioned therearound;

FIGURE 30 is a view showing the carcass fully expanded to toric shape with the breaker and tread assembly folded down thereabout;

FIGURE 31 shows the first step in an alternate method of expanding the carcass, with deflation of the drum expanding bladders;

FIGURE 32 shows the second step with the shaping bladder inflated slightly and the drum segments moved axially outside of the tire beads;

FIGURE 33 shows the next step wherein the drum expanding bladders are inflated to urge the drum segments radially outwardly;

FIGURE 34 shows the completion of the alternate shaping procedure with the shaping bladder fully expanded and the breaker and tread assembled onto the carcass.

Figure 5:
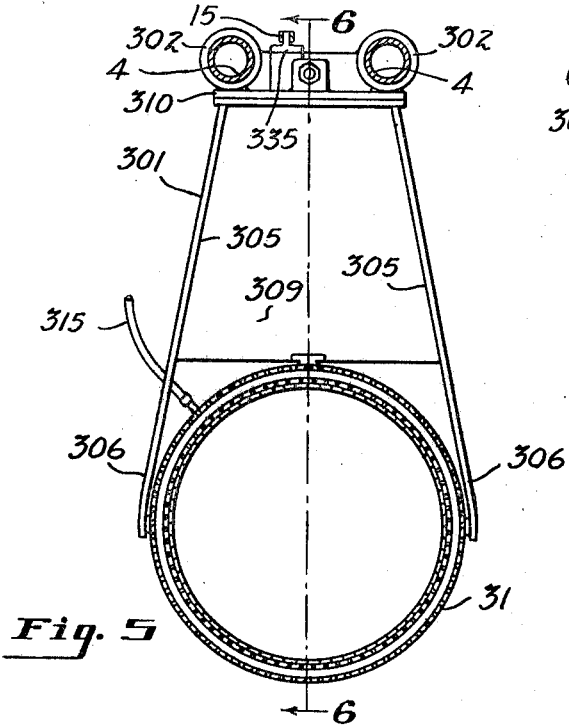
FIGURE 5 is a frontal view of the breaker-tread assembly transfer mechanism.
Figure 6:
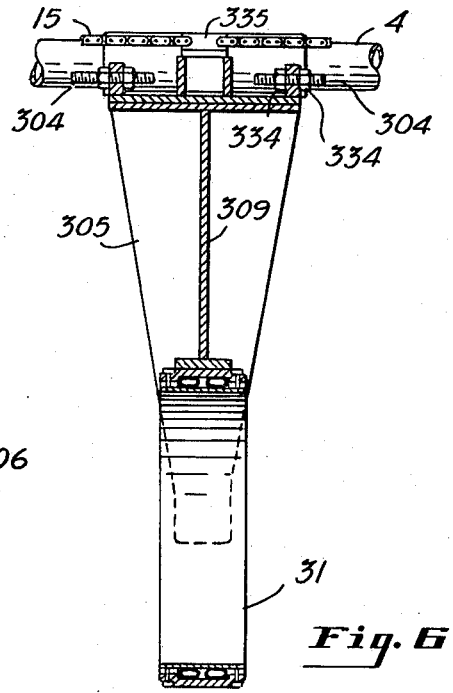
FIGURE 6 is a cross-sectional view taken along lines 6—6 of FIGURE 5.

Referring now to the novel process of building a tire, more particularly a radial cord belted tire, reference is made to FIGURE 1 in which the over-all tire building assembly is shown. Seen in the figure are two drums, a carcass building and shaping drum 1 and a tread and breaker assembly drum 2. Located between the two drums is a transfer mechanism 3 adapted to transport the tread and breaker assembly from drum 2 to a position coaxially disposed around drum 1. The transfer mechanism is adapted to move along two tubular overhead rails 4 utilizing an appropriate chain drive 15 (shown partially in outline) movable about sprockets 7 and 8. The rails 4 are immovably fastened at either end to structures 5 and 6 which house the hydraulic, pneumatic, and electrical controls for the respective drums 1 and 2.

Drum 1 is attached to shaft 11 which is connected through rotoseal hub 12 and housing 5 to suitable rotating means. In like manner, drum 2 is attached to the end of rotatable shaft 13 which shaft is itself connected to rotating means within housing 6.

The carcass is built on drum 1 by wrapping plies around the drum, the surface of which is composed of a tubular inflatable shaping bladder 23, said plies being wider than the drum and overlapping cylindrical extensions 24 which are composed of annular inflatable ply turnover bladders. The carcass is completed in a manner to be explained in more detail later on. The breaker and tread are assembled on drum 2, the cylindrical surface of which is composed of an elastomeric material 9 and the diameter of which can be uniformly increased or decreased as desired. The transfer mechanism 3 then moves to a position so that annular ring 31 is disposed around said tread and breaker assembly. The ring then grips the breaker and tread assembly and removes it from the drum 2 and transfers it from that position to a point centrally located over drum 1. During this transfer operation, outboard bead ring carrier 22 is in the horizontal position (shown in outline) to provide clearance for movement of the transfer ring toward drum 1. When the tread and breaker assembly are centrally located over the drum 1, the shaping bladder 23 is inflated, causing the carcass to assume a toric shape and to contact the inner annular surface of the tread and breaker assembly. The transfer mechanism 3 is returned to its neutral position between the two drums, the shaping bladder 23 is deflated, and the tire is removed from the drum 1 for finishing.

Describing the process with more particularity, the carcass building and shaping operation consists in removing a series of carcass plies from suitable servicing equipment (not shown) located near the building drum 1, which equipment does not constitute a part of this invention, and wrapping the plies one at a time around the drum so that the edges of the plies overlap extensions 24 an equal amount. Each of these plies is composed of a plurality of closely spaced parallel extending fabric cords, coated with a suitable elastomer; and, in the production of a radial cord tire, lie in a direction which is substantially parallel to the axis of the drum. Bladders underlying the surface of the drum are inflated so that the drum assumes a uniform diameter which is greater than that of the annular extension 24 thus providing a suitable shoulder at either side of the drum against which annular inextensible bead rings are subsequently placed.

Bead rings are then placed upon the inboard bead ring carrier 21, vertically aligned with the axis of the drum, and the outboard bead ring carrier 22 which pivots from a horizontal to a vertical position. The bead ring carriers are then moved axially inwardly over the annular extensions 24 to accurately place the bead rings against the carcass plies overlying the aforementioned shoulders. The carriers 21 and 22 are then moved axially outwardly from the shoulders to a position where they are clear of the annular extensions 24 which are then pneumatically inflated to turn up the edges of the carcass plies overlying these extensions and to fold them around the bead rings. When the turnover bladders are fully inflated, the bead ring carriers 21 and 22 are again moved axially inwardly, and the outer sleeves 25 of the carriers push the annular bladders over the drum 1, said movement accompanied by deflation of the turnover bladders causing them to collapse in tight engagement with the drum thereby folding the edges of the carcass plies into contact with the portion of the carcass immediately adjacent and inwardly of said bead rings. These edges are then mechanically stitched against the carcass. Preceding the stitching, the inboard bead ring carrier 21 is moved axially away from the drum and the outboard carrier 22 is moved away and is swung down to its horizontal position.

In a separate operation, bladders underlying the surface of the breaker drum 2 are inflated to increase the uniform diameter of the drum. Thereafter breaker plies, composed of a plurality of parallel extending elastomer coated textile or wire cords are wrapped, one at a time, around the surface of the drum, after which the tread stock is applied. The transfer mechanism 3 is then moved to a position whereby the transfer ring 31 is axially centered over and around the drum 2. Bladders disposed around the inside of annular ring 31 are then inflated to urge a series of rigid segments disposed around the inside perimeter of the ring radially inwardly into gripping relationship with the tread and breaker assembly after which the surface diameter of said drum 2 is reduced by deflation of the underlying bladders therein disposed.

While tightly gripped by the annular ring 31, the tread and breaker assembly is moved axially away from drum 2 and is moved axially toward the substantially flat carcass on drum 1 to a position co-axially disposed around the drum. The deflated shaping bladder 23 comprising the cylindrical surface of the drum is then inflated to expand the carcass to toric shape, and upon contact of said carcass with the inner surface of the tread and breaker assembly, the bladders within said ring 31 are deflated to release the grip of the rigid segments against the outer periphery of said assembly. The building operation is completed, after the transfer mechanism is moved away from the building drum, by stitching the tread and breaker assembly against the carcass after which the bladders in the drum 1 are deflated and the tire is removed for finishing.

Tread and breaker assembly drum

In FIGURE 3 is shown a detailed cross-sectional view of drum 2 on which are assembled the substantially inextensible breaker plies 219 and the tread stock 220. This drum is mounted in cantilevered fashion on an annular shaft 13 which is held within housing 6 by suitable means and to which is also attached a pulley 202 which is connected by a suitable belt to driving means (not shown) to thereby rotate said shaft and drum. Sleeve 203 is press fitted, keyed, or otherwise suitably attached to the annular shaft 13 to rotate therewith. Integrally associated with the sleeve is a radially outwardly projecting center disc 204 and two outer discs 205 terminating underneath the surface of the drum, and ribs 206 extending radially outwardly and terminating in circular rims 225 provided with means such as shoulders 226 serving as drum expansion limiting means. Annular cross members 207 span the three discs 204, 205 in a circumferential direction inwardly of the outer ends of said discs, thereby defining channels 208 in which inflatable tubular bladders 209 are disposed.

These bladders are connected by suitable means such as valve stem 214 through opening 215 in cross member 207 to flexible tubular conduits 216 which are in turn connected by a T 217 having a rotary seal joint to a suitable air pressure hose 218 axially disposed within the annular shaft 13.

Each of the bladders is preferably constructed from cord reinforced elastomeric material and is provided with an intermediate rib 210 which divides the bladder into an outer chamber 212 and an inner chamber 213 connected by an air passage 211. Use of the rib 210 permits a greater amount of expansion of the bladder having a given width than would be possible with a bladder not having such a rib thereby increasing the magnitude that the drum 2 can expand. The cylindrical surface of the drum is composed of a thin extensible tubular sleeve 227 tightly fitting over rigid segments 221. These segments 221 are axially disposed across the drum and are relatively long in comparison to their width. The radially outer relatively flat surface of the segments cooperatively defines a relatively solid cylindrical surface underlying said extensible sleeve 227. The ends of the segments comprise radially inwardly directed projections 222 terminating in loops 223. The loops of the adjacent members cooperatively define a channel in which appropriate resilient restraining means such as a garter spring 224 is disposed. Both springs coact to bias the segments 221 radially inwardly against the outer edges of discs 204, 205.

Upon introduction of air into the bladders 209, these bladders exert a radial outward force against the inner surface of the segments thereby pushing the segments against the yielding resilient garter springs 224 effectuating an increase in the diameter of the drum. Means such as shoulders 226 on flanges 225 serve to limit the outward movement of the segments when the loops 223 contact these shoulders.

As stated before, when constructing the breaker-tread assembly the bladders 209 are inflated thereby expanding the diameter of the drum to conform to the approximate inner diameter that the tread and breaker assembly will have in the completed tire. The appropriate numbers of breaker plies 219 are then laid upon the drum, generally in such a manner that the cords in adjacent plies will lie at an equal but opposite angle with respect to the circumferential plane of the tire. The breaker plies may, however, be laid so that the cords are parallel (i.e. 0° angle) to this circumferential plane if desired.

After the various breaker plies are wrapped around the drum, the tread 220 is laid thereupon. The transfer mechanism 3 is then moved into a position surrounding the drum and breaker-tread assembly and is activated to grip the outer surface of the tread while the air is released from the bladders 209. Upon release of the air pressure from the bladders, the garter springs 224 urge the segments radially inwardly thereby collapsing the drum to its minimum size. This inward movement is limited by the ends of the discs 204, 205. The drum in its collapsed position is shown in FIGURE 4 wherein like numbers correspond to like parts.

The effective diameter of the drum can be changed in a number of ways such as by replacement of the segments with others having longer or shorter projections 222 or by changing the radial distance of shoulders 226 on rims 225 from the axis of the drum. Furthermore, by varying the thickness of the elastomeric sleeve 227, the maximum diameter of the drum can be altered.

Transfer mechanism

The various details of the tread and breaker transfer mechanism 3 are shown in FIGURES 2, 5, 6, 7, and 8. As previously mentioned, this mechanism slides on two overhead tubular rails 4 which are attached at either end to housings 5 and 6. The mechanism comprises a frame member 301 of I-beam construction, the two flanges 305 of said I-beam spaced apart from one another by a reinforcing cross member 309. A platform 310 is connected to the top of the frame member, and mounted on said platform are two annular channels 302 which ride on the tubular rails 4. From that platform, the two flanges 305 taper outwardly from one another and project down beyond the reinforcing members 309 to form spaced-apart brackets 306. Suspended between and attached to the brackets 306 as well as to the reinforcing member 309 is the annular transfer ring 31.

The transfer mechanism is adapted to move back and forth on the rails 4 by a chain 15, the ends of which are securely attached to the flange 335 on top of platform 310, said chain passing over sprockets 7 and 8. Sprocket 8 is mounted on a shaft 323 secured between pillow blocks 324 slidably attached to platform 325 which is secured to housing 6. By rotating threaded screw 326, tension on the chain can be regulated by urging the pillow blocks 324 toward or away from housing 6.

Refering now to FIGURE 2, it is noted that motor 319 drives sprocket 7 through a slip clutch 327, chain 328, and sprocket 329. This sprocket is mounted on the same shaft 330 on which sprocket 7 is secured, said shaft 330 being secured between support means 331 such as pillow blocks or bushings.

Threaded rods 304 attached to the top of platform 310 by bolts 334 (FIGURE 6) are adapted to contact suitable supports 321 and 322 shown in FIGURE 1, said supports connected to housings 5 and 6 to arrest the movement of the transfer mechanism when it is positioned over either the carcass building drum 1 or the breaker-tread assembly drum 2. Suitable limiting switches (not shown) are coupled to the supports 321 and 322 to de-energize the motor when the transfer mechanism is so positioned. Slip clutch 327 protects the motor, chains, and sprockets against damage caused by abrupt stopping of the transfer mechanism at the end of its travel. Additional means are preferably provided for repositioning the transfer mechanism on the precise center line of the drums, thereby compensating for inertia in the motor or the transfer mechanism which would tend to prevent precise centering of the mechanism after the stops 304 contact either of the supports 321 or 322.

Figure 7:
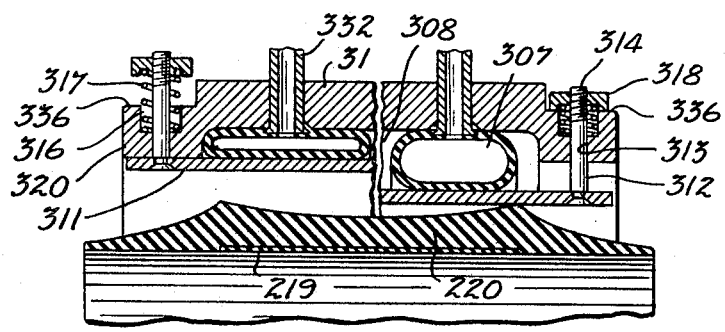
FIGURE 7 shows a cross-sectional cut-away view of the transfer ring with one segment shown in two alternative positions.
Figure 8:
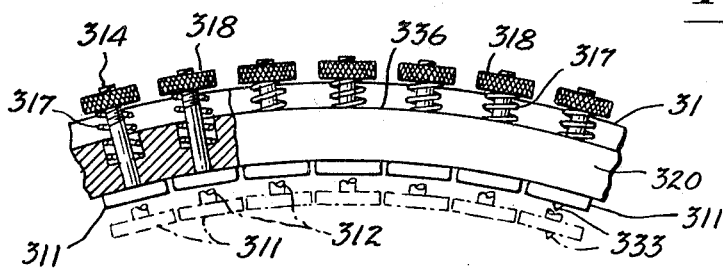
FIGURE 8 is a partial cross-section of the transfer ring showing several of the segments.

A series of rigid rectangular elongated elements 311 shown in FIGURES 7 and 8 are axially aligned in side by side relationship around the inside surface of the ring 31, said segments preferably being made out of metal or other other rigid material. Each segment is provided on its surface adjacent the ring with two studs 312, one at either end thereof, projecting through hole 313 in ring 31, each stud having a threaded end 314. Recesses 316, substantially larger than the diameter of the studs, are provided in the outer surface of the ring 31, and into said recesses and around said studs are placed small springs 317. One end of each spring bears against the bottom of the recess and the other end against suitable means such as a knurled knob 318 threaded onto the end of stud, said spring serving to bias the segment radially outwardly to a position whereby it abuts a suitable shoulder 320 on either side of the interior surface of the ring. The circumferentially extending shoulders 320 define a channel 308 therebetween, and within the channel are disposed tubular inflatable bladders 307. When the bladders are deflated, the segments are biased in their outward position as shown on the left-hand portions of FIGURE 7; and when the bladders are inflated, the segments are urged radially inwardly toward the central axis of the transfer ring as shown in the right-hand portion of FIGURE 7, thereby reducing the effective diameter of the annular space within the ring. Air is introduced into the bladders through an appropriate valve 332 in each bladder in airtight communication with air inlet means in the rim, which means are in turn connected to an air pressure hose 315 communicating with a source of pressurized air. Inflation of the bladders 307 causes the segments to move radially inwardly, which movement is arrested when knob 318 abuts recessed shoulder 336. The distance that each segment moves can be easily regulated by turning knobs 318, and thus the minimum effective diameter within the ring 31 can be varied and controlled simply and accurately.

Preferably one or two sharp studs 333 are provided on the radially inner face of certain of the segments, which studs serve to embed themselves in the tread when the bladders 307 are inflated, thereby providing positive gripping of the tread and breaker assembly by the annular transfer mechanism.

It can be readily seen in FIGURE 1 that the transfer mechanism is in constant axial alignment with both of the assembly drums and no adjustments are needed in that respect. Furthermore, the mechanism is provided with adjustable means to readily adapt it to breaker-tread assemblies for different sizes of tires and to insure accurate positioning of the transfer ring over both drums.

Carcass building machine and operation

Referring now to FIGURE 9, a partial cutaway view of the carcass building apparatus is shown having a substantially cylindrical surface comprising a drum 1 and annular extensions 24. The surface of the drum consists of a tubular shaping bladder 23 which when deflated is substantially flat, and lays between two rows of rigid projections 120, the function and description of which will be explained in more detail hereafter. The annular end portions 24 are composed of ply turnover bladders which, in connection with bead ring carriers 21 and 22 (FIGURE 1) serve to turn the edges of the carcass plies disposed on said cylindrical surface around appropriately positioned bead rings. The details of the construction and operation of the turnover bladders and the bead ring carriers are fully explained and described in U.S. 3,171,769 and form no part of the present invention other than in their associated relationship with other parts of the novel apparatus.

Briefly, though, again referring to FIGURE 1, the inboard bead ring carrier 21 is mounted on carriage 45 and the outboard bead ring carrier is mounted on carriage 46. These carriages 45 and 46 are adapted to move along parallel guide rods 44 supported by bracket 47 adjacent the housing 5, intermediate bracket 48 and an outer bracket (not shown).

A pneumatic or hydraulic cylinder 49 within the housing 5 is provided with a piston 50 attached to the carriage 45 of the inboard carrier 21 to move the carrier axially toward and away from the building drum 1. A second cylinder 57 and piston (seen in outline behind guide rod 44) are connected to carriage 46 to move the outboard ring carrier axially toward and away from the drum 1.

A plurality of spring loaded rods 60 are circumferentially disposed about the inboard carrier 21 and are adapted to abut the housing 5 when the carrier is retracted. These rods facilitate the manual placement of a bead ring within the inboard carrier, and their construction and function are described in detail in the aforementioned application.

A pair of rigid cam plates 51 are supported on opposite sides of carriage 46 and are both attached to a carrier (not shown) which is adapted to move in a horizontal direction on a pair of guide rods 41 located below and parallel to rods 44. A cylinder 52 is provided with piston 53 connected to bracket 54 which in turn is attached to the carrier for shifting the cam plates 51 axially toward or away from the housing 5. Each cam plate is provided with a horizontally extending slot 55 terminating in a downwardly curved portion 59. A roller 56 attached to each side of the carriage 46 of the outboard bead ring carrier 22 rides in the slot of the plate adjacent to that side. Movement of the cam plates 51 toward the housing when the carrier 22 is in a remote position relative to the drum 1 causes roller 56 to move in the slot in a downwardly directed path thereby causing the carrier to pivot about pin 58 from a vertical to a horizontal position (shown in outline). On the other hand, when the cam plates are remote from housing 5, roller 56 is disposed in the horizontal portion 55 of the slot and the carrier 22 is held in its vertical position free to move toward or away from the drum in axial alignment therewith.

Referring again to FIGURE 9, there is shown a tubular drum shaft 102 which is horizontally supported and rotationally driven by suitbale means within housing 5. Screw shaft 103 is centrally positioned within drum shaft 102 and is provided with threads 104, 105, on its outer surface, the pitch of the threads 104 being opposite in direction to the pitch of threads 105, and said threads being symmetrically disposed on either side of the radial center line of said drum. Suitable means such as a clutch (not shown) is provided for rotation of the two shafts when the clutch is engaged, and for rotation of the screw shaft 103 independently of the drum shaft 102 when disengaged. A center disc 101 comprising a plurality of radially outwardly extending spokes 108 terminating radially inwardly of the shaping bladder 23 is joined by hub 155 and key 157 to the drum shaft 102 to be rotated therewith.

A channel 106 within at least some of the spokes 108 communicates through inlet 107 with a source of pressurized air. One of the shaping bladder valve stems 112 is disposed in each of said channels 106, and airtight seal being provided by suitable means such as an O-ring.

Disposed on either side of disc 101 are collars 151 slidably movable on drum shaft 102 in an axial direction toward and away from one another. The collars 151 are attached by screws 153 to traverse nuts 152 threaded on screw shaft 103, said screws extending through slots 154 in the drum shaft. With the drum shaft 102 stationary, rotation of screw shaft 103 causes nuts 152 to move toward or away from one another, which axial movement is imparted to collars 151. Projecting radially outwardly and securely attached to the collars 151 are inner supports 147 for the drum expanding bladders 111 and outer supports 175 for the turnover bladders 24. The drum expanding bladders 111 are radially reinforced tubular inflatable members extending circumferentially around the drum, and when deflated lie flat against flanges 148 forming an integral part of the supports 147. Each bladder has a valve stem 114 which is inserted in passageway 113 within the support 147 and which communicates through an air inlet 115 to a source of pressurized air. These bladders 111, when inflated, serve to increase the diameter of the building drum, as shown in FIGURE 23.

The outer surface of each drum expanding bladder 111 is in contact with a row of segments 116, each row being spaced an equal distance from the central disc 101. The segments in each row are composed of relatively rigid, preferably metal, elements which are relatively narrow in width compared to their length, and which cooperatively define a surface which is essentially cylindrical, said cylindrical surface being coaxially disposed around the axis of the drum. Each segment has two legs or projections 117 extending radially inwardly and terminating in loops 118. The loops cooperatively define a channel or groove in which resilient means, such as garter spring 119, are positioned. These garter springs serve to retain the segments radially inwardly with the loops 118 abutting against flanges 149, forming an integral part of support member 147. When in this position, the segments are in essentially abutting relationship with one another.

Figure 23:
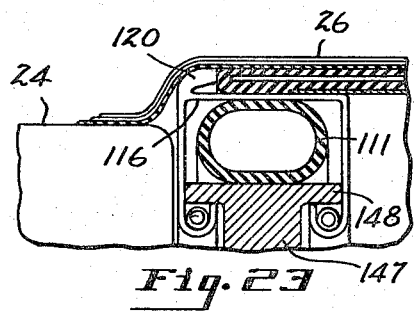
FIGURE 23 shows a partial cut-away view with the drum expanding bladder inflated to form a bead ring abutment shoulder.

Upon inflation of the drum expanding bladders 111, the segments in each row are biased radially outwardly, said biasing movement being limited by contact of said loops 118 against the undersurface of flanges 148 as shown in FIGURE 23. It should be noted that the bladders are preferably inflated simultaneously so as to move both rows of segments at the same time.

A plurality of arcuate gap shields 161 are disposed circumferentially around the drum radially outside of the two rows of segments bridging the gap therebetween to provide a relatively solid back-up support for the shaping bladder 23. The details of these spacers are shown in FIGURES 10-14. FIGURE 10 is a partial cross-sectional view taken through the center disc of the drum 1 when the drum is collapsed, and FIGURE 11 is substantially the same view when the drum is expanded, i.e., when the drum expanding bladders 111 are inflated. In these figures, the hub 155 of the center disc 101 is mounted on drum shaft 102 and is held from slipping by a key 157 or other means. Extending radially outwardly from the hub 155 are spokes 108 which terminate in projections 158 of reduced cross section. An annular circular disc 128 is secured by a nut and bolt 109 to each side of said spokes 108, each disc provided with a notch adjacent each of said projections 158, said notch extending radially inwardly from the periphery of the disc. A channel 106 in each spoke communicates with an annular channel 110 within the hub, which channel 110 is attached to an air pressure inlet 107. The valve stem 112 of the shaping bladder is inserted into the channel 108, and O-ring 146 provides an airtight seal between the stem and the channel.

The gap shields 161 are positioned in overlapping relationship circumferentially around the center disc and are adapted to slide over one another as the drum is expanded and collapsed. The gap shield 162 shown in FIGURE 12 is provided with a guide stem 145 welded or otherwise attached thereto, said stem adapted to fit over the projection 158 of one of the spokes 108 and to slide radially inwardly and outwardly thereon. An annular opening in the surface of the shield is adapted to mate with the channel 106 to cooperatively receive the shaping bladder valve stem 112. Axial displacement of these shields during movement of the two rows of segments 116 toward or away from one another is resisted by the guide stem 145 co-axially engaging projection 158. Four of these guided shields are used in the embodiment shown in FIGURES 10 and 11. Alternately spaced between the guided gap shields are four other shields 163 of the type shown in FIGURE 13.

A rubber layer 167 is cemented or vulcanized to the concave surface of each of these shields 163, said layer having a thickened portion at each end forming a block 168. A stud 169 is molded into each block and a clip 164 is attached to the block by a short bolt 170. Garter springs 160 connected to eyes 165 welded or otherwise attached to the guide stems 145 of shields 162 cooperate with the clips 164 to bias the shields 162 and 163 radially inwardly. The rubber blocks are axially restrained, as seen in FIGURE 14, by the two discs 128, thus precluding axial movement of the shields 163.

The number of guided shields 162 that are used with the drum is dictated by the number of spokes 108 on center disc 101 as well as by the number of valves in the shaping bladder 23. Furthermore, although one gap shield 163 is shown between alternate guided shields 162, this number is for description only, and two or more can be used as desired.

Upon inflation of the drum expanding bladders 111, which force the rigid segments 116 radially outwardly, the gap shields 161 are likewise urged outwardly against the restraining force of the garter springs 160. The guided shields 162 slide radially outwardly on the projections 158 of the spokes 108, urging the shaping bladder toward an increased diameter. Conversely, deflation of the drum expanding bladders 111 reduces the diameter of the drum through the combined efforts of the garter springs 119 urging the segments 116 inwardly and garter spring 160 urging the gap shields 161 inwardly. The O-ring 146 maintains an airtight seal between the shaping bladder valve stem 112 and channel 106 as the stem moves radially within said channel.

Through the combined efforts of the two rows of segments as well as the gap shields overlying said segments, the shaping bladder when uninflated is supported against a relatively solid cylindrical surface. This permits the application of heavy stitching pressure on the shaping bladder during the building of the flat carcass.

Referring again to FIGURE 9, it is noted that each of said segments 116 is provided with a radially outwardly extending projection 120 which is rounded and which, in cooperation with the other segments in each row, define the rounded edges of the building drum. These projections terminate at a radial outward point which is substantially flush with the surface of the shaping bladder 23 when deflated, which bladder lies between the two row of projections. The projections are undercut to form a circumferential groove into which the ends of the gap shields can slide when the two rows of segments are moved axially toward one another to their innermost position.

As mentioned previously, the two outer supports 175 are symmetrically disposed on either side of center disc 101 and project radially outwardly therefrom, terminating in annular bladder support discs 174 and inner clamping rings 178. The outer bead 171 of the turnover bladder 24 is clamped in airtight engagement between support 175 and disc 174, and the inner bead 177 is secured between support 175 and ring 178 using bolts 176 or other suitable means. The bladders 24 are in communication through air passage 172 and air inlet 173 to a source of pressurized air.

FIGURES 15, 16, and 17 show the details of a preferred construction of the shaping bladder used on the building drum to expand the tire carcass to toric shape prior to applying the tread and breaker assembly. Basically, this bladder is constructed of a plurality of plies 121, 122, 123, and 124, of unreinforced elastomeric material wrapped around to form an enclosed inflation chamber 127. The portion of the bladder that is disposed in contact with the gap shields and segments is reinforced with a singular ply of elastomeric material 125 having cords embedded therein running in a substantially axial direction. These reinforcing cords serve to resist undesirable axial expansion of the bladder during inflation thereof, yet do not inhibit the increase of the drum diameter upon inflation of the expansion bladders 111. The laminated construction of the plies of unreinforced elastomeric material in the surface portion of the bladder helps to maintain the uniform shape of the bladder during inflation, and obviates the necessity of having reinforcing cords in this portion of the bladder.

As seen in FIGURE 15, four inflation valves are incorporated into the bladder carcass, these valves comprising a valve stem 112, preferably metallic, and a rubber valve stem pad 126 which pad is embedded in the carcass during construction thereof, the various plies of the carcass being adapted, such as by having appropriate holes cut therein, to accommodate these pads. During the curing of the bladder the rubber pad is molded into the structure as an integral part thereof.

Each of the valve stems 112 is adapted to be inserted through the hole 156 in one of the gap shields 162 into the channel 106 in the center spoke 108 as shown in FIGURES 10 and 11 and is air sealed therein by a suitable O-ring, these being the only airtight engagements between the bladder and the rest of the carcass building apparatus.

It has been found desirable to provide the surface of the bladder, in contact with the carcass plies, with a slightly roughened, preferably knurled, surface. This prevents any tendency of the carcass plies to stick to the bladder, especially after the tire construction is completed and the shaping bladder is being collapsed prior to removing the tire from the drum.

The use of a four ply construction and of four air inlet valves in the shaping bladder as well as various other features as described herein are for purposes of illustration only, it being understood that variations can be made in the construction of the bladder without departing from the novel concept therein embodied. Providing multiple air inlets for the bladder facilitates the uniform inflation thereof, and an adequate number should be provided for this purpose.

In FIGURES 18–21 are shown some of the details of a stitcher of the type suitable for use with the carcass building and expanding drum of this invention. Basically, this stitcher comprises two stitiching disc 130 freely rotatable upon shaft 131 which is supported at each end by rods 132 extending transversely thereto and terminating in shaft supporting sleeves 144. Said rods are mounted in a U-shaped bracket 133 and are resiliently urged toward the drum 1 by spring 134. Each bracket 133 is attached to a rod 135 which telescopes within sleeve 136 and is adapted to be adjustably locked in position using a suitable set screw 137. Both rods 136 are coupled to an axle 138 which is secured between supports 139 and is connected to a suitable cylinder and piston assembly 140 by an arm 141. Actuation of the arm 141 by the piston and cylinder 140 rotates axle 138 which pivots the stitching discs 130 toward or away from the building drum 1. When the discs are in contact with the carcass plies on the drum, the springs 134 serve to control the contact pressure thereon. Arm 141 on axle 138 cooperates with stop 142 comprising a threaded rod secured to the base of the stitcher to limit the pivotal movement of the stitching rollers toward the building drum.

Disposed inside of shaft 131 and supported therein by bushings or the like is screw shaft 180 (FIGURE 20) said screw shaft provided with two sets of oppositely pitched threads. Each set communicates with one of the stitching discs 130 through a slot 187 in shaft 131 extending substantially the full length thereof. A threaded sleeve 190 within the annular shaft 131 engages each set of threads and is connected to hub 194 through bolts and key 195. Ball bearings 189 are located between the hub 194 and outer housing 188, the stitching discs 130 extending radially outwardly from said housing. The bearings permit free rotational movement of the housing 188 and disc 130 relative to the hub 194.

One end of the screw shaft 180 is attached to a chain sprocket 181. A sleeve 182 disposed on shaft 138 and adapted to rotate independently thereof is provided with a sprocket 183 at one end and sprocket 184 at the other. Chain 185 connected to a motor (not shown) transmits rotary motion to sleeve 182, which motions is transmitted through chain 186 to rotate said screw shaft 180. Rotation of the screw shaft 180 is transmitted through threaded sleeves 190 to the hub 194 to move the stitcher discs 130 toward or away from one another to the proper location for the desired stitching operation. When the stitchers are properly located, the piston and cylinder 140 are actuated to pivot the stitchers from the position shown in FIGURE 19 into position (shown in outline) against the carcass plies disposed on the building drum 1.

Figure 22:
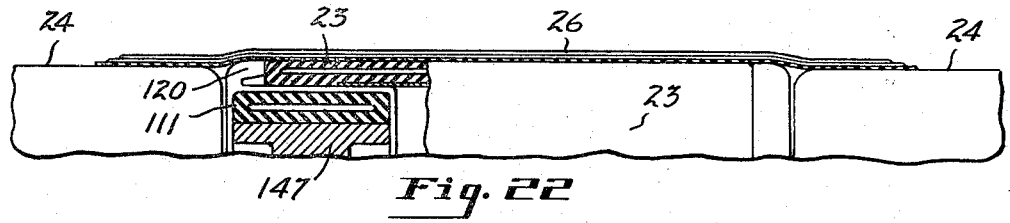
FIGURE 22 represents a partially developed surface of the drum and turnover bladders shown in FIGURE 9 with an inner liner and two carcass plies laid thereon.
Figure 24:
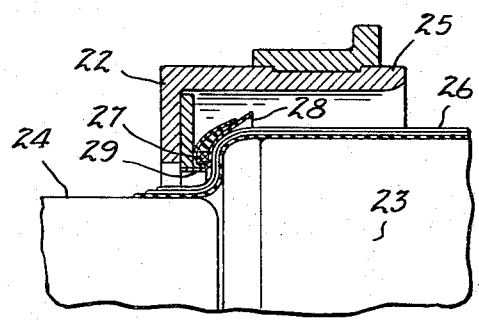
FIGURE 24 shows the bead ring carrier placing a bead ring and flipper against the shoulder.

In building the carcass of a pneumatic tubeless tire, an inner liner of, for instance, butyl rubber is laid upon the cylindrical drum surface as shown in FIGURE 22 after which plies of carcass fabric are applied. Air is then introduced into the drum expansion bladders 111 to inflate the same. As shown in FIGURE 23, the inflation of these bladders 111 biases segments 116 radially outwardly whereupon the projections 120 of the segments form a shoulder at the side of the drum. The outward movement of the segments is limited by flange 148. At this stage, the building drum is of larger diameter than that of the annular turnover bladders 24 and is also larger than the inextensible bead rings to be incorporated into the tire. As shown in FIGURE 24, the bead ring 27 and flipper 28 are placed on a thin cylindrical flange 29 on the outboard bead ring carrier 22 and the carrier is then moved axially inwardly over the deflated bladder 24 to place the bead ring against the shoulder.

Figure 25:
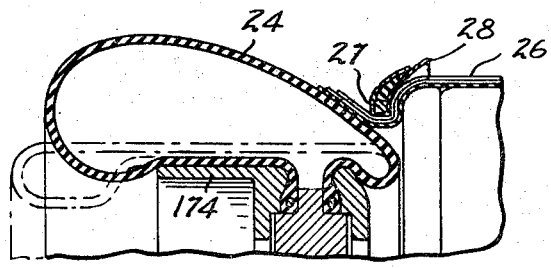
FIGURE 25 is a partial cross-sectional view showing the start of the inflation of the ply turnover bladder.
Figure 26:
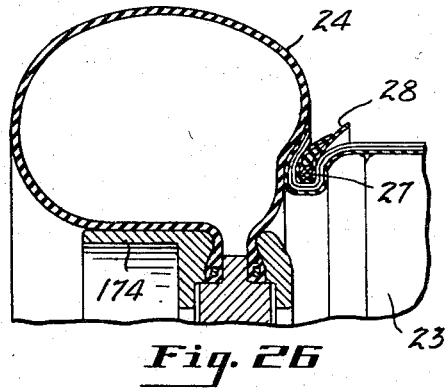
FIGURE 26 shows the ply turnover bladder at a later stage of inflation.

After the bead ring 27 is placed against the carcass overlying the shoulder, the bead ring carrier 22 is moved away from its position around said turnover bladder 24 whereupon the bladder is inflated as shown in FIGURES 25 and 26 to turn the ends of the carcass plies over the bead ring 27. As can be seen in FIGURE 25, initial inflation of the turnover bladder initially pulls the ends of the carcass plies radially outwardly and axially away from the building drum thereby effecting a tight fit of the carcass plies around the inner circumference of bead ring 27. Circumferentially extending ribs (shown in FIGURE 9) molded into the surface of the turnover bladders assist in providing a slip-resistant surface for this purpose. Continued expansion of the turnover bladder as shown by FIGURE 26 results in the ends of the carcass plies being folded radially outwardly and in a direction toward the central axis of said drum.

Figure 27:
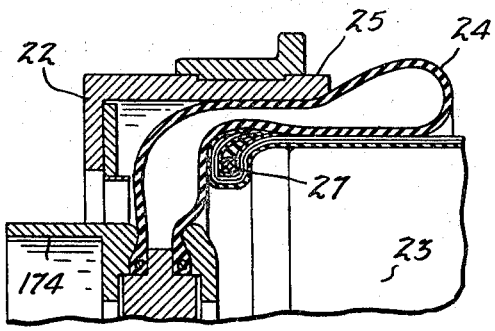
FIGURE 27 shows the bladder almost completely deflated and being pushed over the building drum by the outer sleeve of the bead ring carrier.
Figure 28:
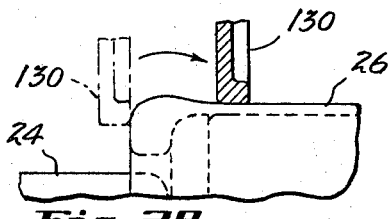
FIGURE 28 shows a partial cross-section of a stitcher roller in position stitching down the folded ends of the carcass.

The bead ring carrier 22 is then moved axially toward the drum whereupon the annular sleeve 25 contacts and pushes the turnover bladder over the drum, as shown in FIGURE 27. At the same time, the bladder 24 is deflated to permit it to traverse axially inwardly and to collapse into a tightly adhering position surrounding the edge of the drum 1. The carrier 22 is then moved away from the drum and is pivoted down to its horizontal position. Thereafter, the ends of the carcass plies are mechanically stitched (FIGURE 28) with the stitcher shown in FIGURES 18-21 utilizing mechanically actuated stitching disc 130 which is pivotally swung into contact with the carcass as previously described. It should be noted that the completed bead assembly assumes the same relative position in the carcass at this state of the construction as it will assume in the finished tire, no rotation or turning of the beads being necessary during the shaping operation.

Although the above description and figures relate to the outboard end of the building drum, it is understood, of course, that the same sequence of operations is concurrently performed at the inboard end, the sole exception being that the inboard bead carrier remains in a vertical position at all times. After the bead rings have been positioned and the ends of the carcass plies turned up therearound and stitched down, chafer strips are applied around the beads after which the carcass is ready to be expanded to toric shape.

It is to be understood that in the case of white sidewall tires the sidewall strips may be applied to the carcass and stitched down prior to the expansion step, or can be applied after the carcass has been expanded and before or after the tread and breaker assembly has been applied thereto.

FIGURE 29 shows an intermediate step of one method of expanding the carcass to toric shape. The transfer mechanism containing the assembled tread 220 and breakers 219 held within the transfer ring 31 is moved to a position whereby the tread and breaker are centered over the carcass 26 on the drum.

Air is then introduced through channel 106 within spoke 108 and stem 112 into the extensible shaping bladder 23, thereby inflating the bladder. During the expansion, the portion of the shaping bladder in contact with the gap shields and segments 116 pulls radially away from the segments in the vicinity of their projections 120 inasmuch as the axially extending reinforcing cords in this portion do not appreciably restrain the bladder against radial elongation, and the bladder is not attached to the segments or to the sides of the drum. Concurrently with the introduction of air into the bladder, the screw shaft (not shown) is rotated to move the shoulders of the drum, with the carcass beads thereagainst, toward one another thereby serving to move the carcass beads together. Movement of the beads toward one another during inflation of the carcass permits the expansion of the same to toric shape without setting up severe stresses in the radial cords of the carcass. When the carcass has been expanded sufficiently to contact the underside of the tread and breaker assembly, the bladders within the transfer mechanism are deflated, thereby causing the mechanism to release its grip on the tread and breaker. The tread and breaker assembly are then suitably stitched to the carcass, a preferred method for this being to increase the air pressure in the shaping bladder 23 to urge the carcass radially outwardly tightly against the inner surface of the tread and breaker assembly thereafter followed by mechanical stitching using stitcher discs 130.

Thereafter the shaping bladder 23 and drum expanding bladder 111 are deflated, the garter springs 119 and 160 (not shown) urging the segments and gap shields radially inwardly to collapse the building drum to its minimum diameter. Inasmuch as this diameter is smaller than the diameter of the beads of the tire, the tire can be easily removed from the drum without ovalizing the tire or disassembling the drum, after which the tire is cured in a suitable mold.

FIGURES 31-34 show the sequential steps of an alternate method of expanding the carcass wherein the beads of the carcass are physically pushed toward one another rather than being permitted to float in as shown in FIGURES 29 and 30. The initial step as shown in FIGURE 31 is to deflate bladders 111 to collapse the drum, while at the same time partially inflating the shaping bladder 23. The segments 116 are then moved away from one another by rotation of the crew shaft 103 (not shown) until the projections 120 are positioned axially outside of the beads (FIGURE 32). Thereafter, the bladders 111 are reinflated to again increase the diameter of the central portion of the drum, thereby moving projections 120 into the position shown in FIGURE 33. Inflation of the shaping bladder 23 is then resumed concomitantly with rotation of the screw shaft. This rotation causes the projections 120 of the segments 116 to traverse axially inwardly thereby pushing said beads 27 toward one another as the carcass is shaped. Alternatively, the shaping bladder 23 can be inflated without traversal of the projections 120 toward one another, thereby permitting the beads to move, unassisted, toward one another as the central portion of the carcass expands radially outwardly. As stated before, when the carcass contacts the inside of the tread and breaker assembly centered thereover, the bladders within the transfer ring 31 are deflated thereby releasing the grip of the segments 311 on the assembly. The assembly is then stitched to the carcass to complete the assembly as shown in FIGURE 34 after which the shaping bladder 23 and forming bladders 111 are deflated and the drum collapsed to permit the tire beads to pass over the projections 120 so that the tire can be easily removed from the drum.

It is thus apparent from the above description that there is no necessity of providing auxiliary expansion limiting rings or jackets with the expanding bladder used on the carcass building drum of this invention. Instead, the expansion of the bladder is limited by the inextensible breakers and tread. This feature can be utilized to advantage by employing pneumatic pressure in the shaping bladder to expand the carcass into the tread and breaker and then, by increasing the bladder pressure, to assist in stitching the tread and breaker to the carcass.

The foregoing description of the tire building apparatus of this invention, including the carcass building and shaping drum, the tread and breaker assembly drum, and the transfer mechanism, has provided a suitable basis for illustrating the details of this invention. However, it should be understood that the invention is not limited to this description, but rather is limited by the scope of the appended claims. There are many variations, both in the equipment and in the method of producing a tire, which are likewise intended as falling within the scope of the invention. For example, the various parts of this tire building machine, as well as the entire machine, may be used with other or additional apparatus, if this is found to be necessary or helpful in the building of a pneumatic tire. For instance, the tread and breaker assembly drum can be provided with a stitcher, either of the type shown in connection with a carcass building drum or otherwise, for stitching the tread and breaker strips together prior to transferring to the carcass drum. Likewise, the stitcher previously described in connection with the carcass drum can be omitted entirely and the stitching operation done by hand.

Furthermore, it is contemplated that various modifications can be made in the design, size, or number of various components used in either of the drums, such as the rigid segments, the gap shields, the number of bladders, etc.

It can be seen that this particular type of transfer mechanism is not limited in application to the specific tire building apparatus as shown herein, but can be used in other applications where it is desirable to grip an annular tire assembly and to transport the same from one place to another. For instance, it could be used on a machine which does not utilize a carcass shaping drum, such as the type employed in the production of bias ply tires, but where it is desirable to build the tread and breaker assembly in a separate operation and to move the assembly over the building drum. Furthermore, such a transfer assembly would find application in positioning a tread and breaker assembly over a drum which is used merely for shaping the carcass; for instance, when the carcass is built by the "flat band" process, and is then transferred to an expander.

It should be noted that the transfer ring in this apparatus is constantly axially aligned with both the tire building drum and the breaker tread assembly drum and no adjustments are needed in that respect. It should also be noted that the transfer ring is flexible in that the inward movement of the segments can be varied by adjusting the knurled knobs 318, this serving to limit the radially inward distance that the segments will move when bladder 321 is inflated.

Likewise, the carcass building drum can be used independently of the transfer mechanism and tread and breaker assembly drum whereupon the breaker strips and tread are, for instance, manually applied to the carcass after it has been expanded to toric shape.

What is claimed is:

1. A tire building machine for producing pneumatic tires comprising:
   (A) A first rotatable drum upon which a tire carcass, including the bead portions thereof, is built and is expanded to substantially toric shape, said drum mounted on a first shaft and provided with means for forming a shoulder at each side thereof, means for increasing and decreasing the diameter of each shoulder, and means for moving the shoulders thus formed axially toward and away from one another,
   (B) A second drum on which an essentially inextensible breaker and a tire tread are assembled, said drum mounted on a second shaft coaxial with said first shaft,
   (C) A transfer mechanism for gripping the assembled tread and breaker and moving the assembly on overhead rails from said second drum to said first drum.

2. A radial cord-belted tire building apparatus comprising:
   (A) A carcass building and expanding machine including:
      (1) A drum mounted in cantilever fashion on a rotatable shaft, and having
         (a) Inflatable means for shaping the carcass to toric shape,
         (b) Means to increase the diameter of the drum to provide a shoulder at either side of the drum, and
         (c) Means to move the shoulders toward and away from one another,
      (2) Bead setting means disposed exteriorly of said drum,
      (3) Inflatable carcass ply turnover means adjacent the ends of said drum,
   (B) A second machine for the assembly of a substantially inextensible breaker and a tread at a diameter corresponding substantially to the final diameter of the completed tire comprising a drum supported in cantilevered fashion to a second rotatable shaft and having a cylindrical surface, the diameter of which can be uniformly varied within limits, and
   (C) A transfer ring for removing said tread and breaker assembly from its drum and moving it to a position substantially concentrically positioned over a carcass disposed on the building and expanding drum.

3. A radial cord-belted tire building apparatus comprising:
   (A) A first carcass building and expanding machine including:
      (1) A drum attached to one end of a horizontally disposed shaft, the other end of which is supported and connected to suitable rotating means, said drum having
         (a) A tubular shaping bladder which is pneumatically inflatable to substantially toric shape and which forms a cylindrical drum surface when uninflated,
         (b) Inflatable means to uniformly increase the diameter of the cylindrical surface of said uninflated shaping bladder to form a bead abutment shoulder at either side of said drum, and
         (c) Means to move the bead abutment shoulders toward and away from one another,
      (2) An inflatable ply turnover bladder at each end of said drum extending axially outwardly therefrom to form a substantially continuous cylindrical surface with said uninflated shaping bladder,
      (3) Bead placing means external of said drum surface for locating a bead against carcass plies disposed on said surface and overlying each of said shoulders,
      (4) Means to inflate said turnover bladders to uniformly fold the ends of the carcass plies over said beads, and
      (5) Stitching discs exterior of said drum for stitching down the plies of the carcass at progressive stages of the carcass building operation,
   (B) A tread and breaker assembling machine including a drum mounted on one end of a substantially horizontal rotatably driven shaft, said drum comprising:
      (1) A substantially cylindrical drum surface covered with an extensible elastomeric material, said drum surface consisting of a plurality of rigid elongated segments axially disposed in side by side relationship,
      (2) Resilient means for restraining the segments in a radially inward position,
      (3) Inflatable bladder means disposed against the undersurface of said segments,
      (4) Means to inflate said bladder means to force said segments radially outwardly to increase the diameter of the drum, and
      (5) Means to limit the radially outward movement of said segments,
   (C) A tread and breaker transfer ring assembly comprising:
      (1) A rigid ring of greater diameter than the outer diameter of the completed breaker and tread asembly,
      (2) Means for maintaining the ring in axial alignment with the carcass building drum and the tread and breaker assembly drum,
      (3) Overhead means to alternately move said ring into a position concentrically and centrally disposed over either of said two drums,
      (4) A plurality of elongated rigid segments disposed circumferentially in side by side relationship of said ring,
      (5) Inflatable means disposed between said ring and said segments to move said segments radially inwardly, and
      (6) Spring actuated guide means for each of said rigid segments to return said segments radially outwardly to their outermost position upon deflation of said inflatable means.

4. A radial cord-belted tire building apparatus comprising:
  (A) A carcass building and expanding machine which is attached to one end of a rotatable shaft which is in turn connected to a suitable support and driving means, said machine including:
    (1) A cylindrical surface to receive the plies of a carcass, said surface having a width greater than the width of said plies and comprising:
      (a) A central drum portion composed of an inflatable tubular shaping bladder, and
      (b) An annular inflatable turnover bladder extending radially outwardly from said central drum portion at each side thereof,
    (2) Means to uniformly increase the diameter of the central drum portion from a diameter smaller than that of the annular inextensible bead rings to be incorporated into the carcass to a diameter greater than said bead rings, thereby forming a bead ring shoulder underlying said carcass plies, said means comprising:
      (a) Two spaced-apart rows of axially aligned elongated segments, all of said segments having radially inwardly turned portions at each end terminating in a loop, each of said loops collectively defining, with the similarly disposed loops of the other segments in the row, a circular groove to receive resilient means for biasing the segments in a radially inward position,
      (b) Rigid shields bridging the gap between said two rows of segments and underlying said shaping bladder,
      (c) An inflatable bladder disposed circumferentially around the drum underlying each row of segments, and
      (d) Means to concurrently inflate these bladders to bias the segments and shields radially outwardly,
    (3) Means to inflate said annular turnover bladders to turn the edges of the carcass plies around the bead rings placed against said shoulders,
    (4) Means to inflate the shaping bladder to essentially toroidal shape, and
    (5) Means to move said bead ring shoulders toward one another during inflation of said shaping bladder,
  (B) A tread and breaker assembling machine comprising a drum mounted on one end of a substantially horizontal shaft, the other end of which is connected to a suitable support and rotating means comprising:
    (1) A substantially cylindrical drum surface covered with an extensible elastomeric material, said surface consisting of a plurality of axially aligned rigid elongated segments disposed in side by side relationship to one another,
    (2) Resilient means for restraining these segments in a radially inward position,
    (3) Inflatable bladder means disposed on the underside of said segments,
    (4) Means to inflate said bladder means to bias said segments radially outwardly to increase the diameter of said drum, and
    (5) Means to limit the radially outward movement of said segments,
  (C) A tread and breaker transfer assembly comprising:
    (1) A rigid ring of greater diameter than the outer diameter of the completed breaker and tread assembly,
    (2) Means for maintaining the ring in axial alignment with the axis of the carcass building machine and the axis of the tread and breaker assembly machine,
    (3) Overhead rails for alternately moving said ring into a position concentrically and medially disposed over said breaker and tread assembly drum and over said carcass building and shaping drum,
    (4) A plurality of elongated rigid segments axially disposed contiguous to one another inside of said ring,
    (5) Inflatable bladder means disposed between said ring and said segments to move said segments radially inwardly into gripping engagement with the tread and breaker assembly, and
    (6) Spring-actuated guide means for each of said rigid segments to return said segments radially outwardly to their outermost position upon deflation of said bladder means.

5. A transferring mechanism for gripping the external surface of an annular breaker and tread assembly and for moving the assembly into position over a tire carcass comprising:
  (A) A rigid annular channel-shaped ring having a diameter which is larger than the outer diameter of the assembled tread and breaker, and having radially inwardly extending shoulders on either side thereof,
  (B) A plurality of rigid narrow elongated axially aligned segments disposed circumferentially around the inside of said ring,
    (1) Said segments positioned in side by side relationship, and
    (2) Each segment provided with a threaded stud at each end thereof extending radially outwardly,
  (C) Apertures in said ring to receive said studs,
  (D) A spring compressed between the outer surface of said ring and a nut threaded onto the portion of said studs projecting outwardly through said ring to bias said segments radially outwardly into contact with the shoulders of said ring, said nuts limiting the extent of the radial inward movement of each said segment,
  (E) A pair of annular inflatable bladders disposed circumferentially within the channel of the ring between said ring and said segments,
  (F) Means for simultaneously inflating said bladders to bias said segments radially inwardly into gripping contact with the outer surface of the tread and breaker assembly,
  (G) Means for moving the mechanism containing said assembly to and from a position substantially centrally located over a tire carcass, and
  (H) Means to deflate the annular bladders in the transfer mechanism to release the grip of the segments on the tread and breaker assembly.

6. In combination with a tire building apparatus including a tread and breaker assembly drum and a carcass building and expanding drum, the improvement comprising a breaker and tread transferring mechanism for gripping the external surface of a tread and breaker assembly and transferring said assembly from said first mentioned drum to a position centrally located over said second drum prior to expanding a carcass on said second drum to essentially toroidal shape comprising:
  (A) Two parallel overhead rails extending from a position over said first drum to a position over said second drum,
  (B) A frame mounted on said rails,
  (C) A drive mechanism for said frame to traverse said rails,
  (D) A rigid annular ring attached to said frame, said ring having an inner diameter which is larger than the outer diameter of the tread and breaker assembly,
  (E) A plurality of rigid narrow axially extending elongated segments disposed circumferentially around the inside of said ring and normally spaced apart from one another, each having a threaded stud at either end thereof extending radially outwardly through apertures in said ring, (F) A pair of annular bladders disposed circumferentially around the ring between the ring and said segments, (G) Means for inflating said bladders to bias said segments radially inwardly, and (H) Means for adjusting the inner diameter of the ring comprising:
  (1) An adjustment nut threaded on each stud outwardly of said ring, larger than the aperture therethrough, and
  (2) A spring compressed between the ring and the nut to bias the segment radially outwardly.

7. A carcass building an expanding apparatus comprising:

(A) A deformable building drum attached to one end of a supported, rotatably driven shaft and adapted to be rotated therewith, including an inflatable elastomeric tubular shaping bladder comprising the surface of said drum, said bladder when uninflated assuming a substantially cylindrical shape, (B) Means connected to a source of pressurized air for uniformly inflating said bladder to toric shape, (C) A row of rigid segments placed side by side and disposed substantially circumferentially around the drum on either side of the center line of said drum and underlying said shaping bladder, each row of segments axially movable toward and away from one another, each segment having a rounded projection extending radially outwardly therethrough and terminating substantially flush with the outer surface of the uninflated shaping bladder and cooperating with the other projections of the segments in the same row to form rounded drum shoulders, (D) Gap shields disposed between said rows of segments and said inflatable bladder to bridge the gap between said two rows of segments, (E) Means disposed on the underside of each row of segments for moving said segments radially outwardly to increase the diameter of the drum, (F) Resilient means engaging said segments and said shields for biasing the same radially inwardly, and (G) An annular extension disposed on either side of the drum and projecting axially out therefrom comprising an inflatable ply turnover bladder which when deflated forms a continuation of the cylindrical surface of the building drum at its smallest diameter.

8. A carcass building and expanding apparatus comprising:

(A) An annular shaft connected at one end to a suitable support and rotating means, (B) A screw shaft of smaller diameter concentrically disposed within said annular shaft and provided with a set of left-hand threads and a set of right-hand threads spaced apart from one another, (C) Clutch means to couple said two shafts together, (D) A drum mounted upon said annular shaft and adapted to rotate therewith, the surface of said drum consisting of an inflatable tubular shaping bladder communicating with a source of pressurized air, said bladder being substantially cylindrical when uninflated and assuming a substantially toric shape when inflated, the width of said uninflated bladder being less than that of the carcass plies to be laid thereupon, (E) Means to vary the diameter of said shaping drum from a diameter smaller than that of the annular bead rings to be incorporated into a tire to a diameter larger than said bead rings and comprising:
  (1) Two spaced-apart rows of segments circumferentially disposed around the building drum interiorly of said shaping bladder, said segments being radially inwardly restrained by resilient bands, each of said segments provided with a projection extending radially outwardly therefrom, said projections defining the shoulder portions of said drum and terminating substantially flush with the outer surface of the deflated shaping bladder,
  (2) A circumferentially disposed inflatable tubular bladder underlying each row of segments,
  (3) Means to simultaneously inflate and deflate each of said underlying bladders, and
  (4) Shields bridging the gap between the two rows of segments, said shields positioned circumferentially around the outside of said segments, and underlying said shaping bladder;

(F) Each of said rows of segments communicating with one set of threads on said screw shaft whereupon rotation of said shaft independently of said annular shaft moves said rows axially toward or away from one another, (G) An annular member adjacent each shoulder of said building drum and cooperatively engaged with said drum to from a substantially cylindrical surface of uniform diameter smaller than the diameter of said bead rings, each of said members comprising:
  (1) A rigid support means communicating with said screw shaft and axially movable toward and away from the other support means concurrently with movement of said rows of segments, and
  (2) A ply turnover bladder attached to said support means and communicating with a source of pressurized air, said bladder shaped so that upon inflation of the same, the ends of the plies of the carcass overlying the shoulder portion of said drum are folded over the bead rings positioned against said shoulders, and (H) Means to rotate said screw shaft during inflation of said shaping bladder to move said two rows of segments, and the shoulder portions of the drum formed by the aforementioned projections on said segments, towards one another.

9. An apparatus according to claim 8 further provided with an annular means on each side and spaced from said drum, each of said means adapted to
  (A) Move from a position outside of said drum to a position concentrically surrounding said drum to place a bead ring against the carcass plies overlying said shoulders of said drum, and
  (B) Move from a position outside of said drum to a position over said drum to bias said turnover bladder, when inflated, over the shoulder portion of said drum concomitantly with deflation of said bladder to collapse at least a portion of said bladder onto said drum.

10. An apparatus for building and shaping the carcass of a pneumatic tire including a drum mounted upon a rotatable shaft, the cylindrical surface of said drum comprising an inflatable tubular shaping bladder adapted to receive carcass plies wrapped therearound, means to uniformly increase the diameter of said drum thereby forming shoulders at the sides thereof, and means for turning the edges of carcass plies around inextensible bead rings placed against the portion of the carcass plies overlying said shoulders, the improvement comprising two separate, spaced-apart rows of rigid elongated segments one row on either side of said drum circumferentially disposed underneath said shaping bladder, each of said segments being axially aligned with said rotatable shaft and being provided with a radially outwardly extending projection terminating flush with the surface of said shaping bladder when uninflated, and along with the other segment projections in the same row cooperatively defining one of said drum shoulders, said two rows of segments adapted to be moved axially toward and away from one another.

11. In a tire carcass building and shaping drum adapted to be attached to a rotatable shaft, including a sleeve mounted upon said shaft and provided with radially outwardly extending spokes centrally located intermediate the sides of said drum and terminating underneath the surface of said drum, said surface comprising an inflatable tubular shaping bladder, and means provided to uniformly increase the diameter of said drum, the improvement comprising a row of segments disposed on either side of, and equally spaced from, said spokes, each row consisting of a plurality of substantially elongated axially aligned segments placed side by side, the radially outwardly directed faces thereof cooperatively forming a cylindrical surface, radially inwardly extending projections at either end of said segments terminating in loops adapted to receive appropriate garter springs for retaining the segments in a radially inward direction, a short projection extending radially outwardly from the face of each of said segments adjacent the ends of the drums, said projection being curved axially inwardly toward the medial plane of said drum to cooperatively define the drum shoulders and terminating at a radially outward point substantially flush with the surface of said drum composed of said deflated shaping bladder, said rows adapted to move axially toward and away from said spokes.

12. An apparatus according to claim 11 with the further improvement comprising a series circumferentially overlapping shields bridging the gap between the two rows of segments and disposed immediately radially inwardly of said shaping bladder and outwardly of said segments, some of said shields disposed over said spokes and provided with annular sleeves radially slidable upon said spokes, the remaining shields disposed between said spokes, and all of the shields connected to resilient means for urging said shields radially inwardly, the shields cooperatively defining with said segments a substantially solid cylindrical surface underlying said shaping bladder.

13. In an apparatus for building and shaping the carcass of a pneumatic tire including a drum mounted upon a rotatable shaft and held apart therefrom by a plurality of radially outwardly extending spokes engaging said shaft, the cylindrical surface of said drum comprising an inflatable tubular shaping bladder with a plurality of inflation inlets communicating through passageways within said spokes to a source of pneumatic pressure, a row of circumferentially extending segments disposed on either side of said spokes and underlying said shaping bladder, said rows adapted to be moved toward or away from one another, annular inflatable means underlying each row of segments to increase the diameter of said drum upon inflation thereof and resilient means for urging said segments radially inwardly upon deflation of the same, the combination therewith comprising a plurality of arcuate gap shields underlying said shaping bladder and bridging the gap between said two rows of segments, said shields disposed in circumferentially overlapping relationship with one another radially outwardly of said segments, some of said shields disposed over said spokes and provided with an annular slidable spoke engaging sleeve on the concave surface thereof underlying an opening in the shield in alignment with the passageways in said sleeve adapted to slidably move radially outwardly and inwardly upon expansion and contraction of the diameter of the drum, and the remainder of said shields adapted to be alternately disposed between said first shields intermediate said spokes, and a garter spring extending between each of the adjacent spokes and engaging said shields to restrain them in a radially inwardly direction.

14. An apparatus according to claim 13 wherein each spoke engaging sleeve is provided with means for holding the ends of said garter springs, and the shields without sleeves are provided with loops on the concave surface thereof for receiving the garter springs intermediate their ends.

15. An apparatus according to claim 13 with the addition of a radially extending disc mounted on either side of the spokes and terminating adjacent the concave surface of all of said gap shields when disposed in their radially innermost position, said discs serving to restrict the axial movement of the shields located circumferentially between said spokes.

16. An elastomeric tubular shaping bladder adapted to be used on a tire carcass building and expanding apparatus, the outer surface of said bladder comprising the cylindrical surface of a tire building drum mounted on the end of a rotatable shaft, said drum provided with two rows of substantially rigid segments underlying said shaping bladder and disposed circumferentially around said drum, and substantially rigid shields spanning the gap between said two rows of segments, said shaping bladder being resilient and extensible throughout its surface area and provided with radially extending reinforcing cords throughout the portion thereof in contact with said segments and said shields, said cords adapted to limit axial expansion of that portion of said bladder during inflation of said bladder to toric shape.

17. A bladder according to claim 16 provided with a plurality of air inlets in the reinforced portion thereof, adapted to be connected between said two rows of segments to a source of air under pressure.

18. A bladder according to claim 16 wherein the portion thereof comprising the surface area of the drum is provided with a knurled finish.

19. An apparatus for building and shaping a tire carcass comprising a drum mounted upon the end of a rotatable tubular shaft, the surface of said drum comprising an inflatable tubular shaping bladder, a cylindrical supporting surface underlying said bladder comprising two spaced-apart rows of axially elongated rigid segments equally spaced from the medial plane of said drum, and a plurality of overlapping shields spanning the gap between said two rows, each of said segments provided with a radially outwardly extending projection terminating substantially flush with the building surface of said shaping bladder, said projection cooperatively defining with the similarly disposed projections of the other segments in the same row, a bead abutment shoulder for said drum, and a tubular inflatable bladder circumferentially disposed interiorly of each row of segments to urge said segments radially outwardly upon inflation of said bladder, the improvement comprising a screw shaft provided with means for rotating the same independently of rotation of said tubular drum shaft, said screw shaft provided with two sets of threads of opposite pitch equally spaced from the medial plane of said drum, a support for each row of segments and the bladder underlying the same, each of said supports slidably mounted on said tubular shaft and communicating with one set of threads of said screw shaft whereupon rotation of said screw shaft independently of said tubular shaft causes movement of said two rows of segments and underlying bladders toward or away from one another, thereby decreasing or increasing the distance between said drum shoulders.

20. The improvement according to claim 19 wherein said screw shaft is centrally disposed within said tubular drum shaft and is adapted to be engaged and disengaged therewith through clutch means, and each of said supports communicates with a set of threads on said screw shaft through a slot in said tubular shaft.

References Cited

UNITED STATES PATENTS

| | | | |
|---|---|---|---|
| 2,407,152 | 9/1946 | Haase | 156—127 |
| 2,814,330 | 11/1957 | Vanzo et al. | 156—128 X |
| 2,814,331 | 11/1957 | Vanzo et al. | 156—123 |
| 2,822,027 | 2/1958 | Hollis | 156—127 |
| 2,871,912 | 2/1959 | Kraft | 156—126 |
| 2,979,110 | 4/1961 | Henley | 156—415 |

(Other references on following page)

UNITED STATES PATENTS

| | | | |
|---|---|---|---|
| 3,078,204 | 2/1963 | Appleby | 156—132 |
| 3,138,510 | 6/1964 | Hindin et al. | 156—123 X |
| 3,143,450 | 8/1964 | Barber et al. | 156—126 |
| 3,188,260 | 6/1965 | Nebout | 156—416 X |
| 3,171,769 | 2/1965 | Henley et al. | 156—132 X |
| 3,184,361 | 5/1961 | Allitt | 156—123 X |
| 3,188,260 | 6/1965 | Nebout | 156—416 X |
| 3,219,510 | 11/1965 | Frazier | 156—132 X |

FOREIGN PATENTS

| | | |
|---|---|---|
| 932,792 | 7/1963 | Great Britain. |
| 906,538 | 9/1962 | Great Britain. |

EARL M. BERGERT, Primary Examiner

C. B. COSBY, Assistant Examiner

U.S. Cl. X.R.

156—123, 403, 416